United States Patent [19]

Kimoto et al.

[11] Patent Number: 5,498,943
[45] Date of Patent: Mar. 12, 1996

[54] FEEDBACK CONTROL DEVICE

[75] Inventors: Takashi Kimoto; Daiki Masumoto; Hiroshi Yamakawa; Shigemi Nagata, all of Kawasaki, Japan

[73] Assignee: Fujitsu Limited, Kawasaki, Japan

[21] Appl. No.: 113,110

[22] Filed: Aug. 30, 1993

[30] Foreign Application Priority Data

Oct. 20, 1992 [JP] Japan ................................... 4-281204

[51] Int. Cl.⁶ ..................................................... G05B 13/02
[52] U.S. Cl. ......................... 318/601; 318/562; 364/151; 395/23
[58] Field of Search ..................................... 364/151, 148, 364/165, 150, 157, 822, 431.05, 431.04; 395/22, 21, 23, 24, 68, 906; 318/560, 562, 563, 565, 567, 569, 600, 601

[56] References Cited

U.S. PATENT DOCUMENTS

| | | | |
|---|---|---|---|
| 5,151,822 | 9/1992 | Hekker et al. | 364/822 |
| 5,200,898 | 4/1993 | Yuhara et al. | 364/431.04 |
| 5,255,347 | 10/1993 | Matsuba et al. | 395/23 |
| 5,267,502 | 12/1993 | Gent et al. | 395/22 |
| 5,268,834 | 12/1993 | Sanner et al. | 364/151 |

Primary Examiner—William M. Shoop, Jr.
Assistant Examiner—John W. Cabeca
Attorney, Agent, or Firm—Staas & Halsey

[57] ABSTRACT

A feedback control device at a certain control time, predicts a feedback quantity at the next control time on the basis of a feedback quantity fed back from a controlled object and then performs a control operation based on the predicted feedback quantity. The feedback control device includes a predictive control unit for producing such an actuating signal as to decrease a deviation between the predicted feedback quantity and a desired value. The actuating signal is used to control the controlled object. This eliminates the detrimental effects of time delays associated with the controlled object or the control device, thus ensuring good control. The use of the predictive control unit permits the controlled quantity from the controlled object to converge to the desired value monotonically and quickly. The predictive control unit may use a layered neural network having an input layer supplied with a feedback quantity and an input value corresponding to an actuating signal, and an output layer outputting a predicted feedback quantity. The deviation is back propagated from the output layer to the input layer by a relaxation algorithm in order to update the input value. The updated input value is applied to an actuating unit as an actuating signal, thereby controlling the controlled object.

13 Claims, 23 Drawing Sheets

| | x (I) | Δ α (I) | x (I+1) |
|---|---|---|---|
| 1 | -0.50 | -15.00 | -0.71 |
| 2 | -0.50 | 0.00 | -0.50 |
| 3 | -0.50 | 15.00 | -0.26 |
| 4 | -0.40 | -15.00 | -0.62 |
| 5 | -0.40 | 0.00 | -0.40 |
| 6 | -0.40 | 15.00 | -0.15 |
| 7 | -0.30 | -15.00 | -0.54 |
| 8 | -0.30 | 0.00 | -0.30 |
| 9 | -0.30 | 15.00 | -0.04 |
| 10 | -0.20 | -15.00 | -0.45 |
| 11 | -0.20 | 0.00 | -0.20 |
| 12 | -0.20 | 15.00 | 0.06 |
| 13 | -0.10 | -15.00 | -0.35 |
| 14 | -0.10 | 0.00 | -0.10 |
| 15 | -0.10 | 15.00 | 0.16 |
| 16 | 0.00 | -15.00 | -0.26 |
| 17 | 0.00 | 0.00 | 0.00 |
| 18 | 0.00 | 15.00 | 0.26 |
| 19 | 0.10 | -15.00 | -0.16 |
| 20 | 0.10 | 0.00 | 0.10 |
| 21 | 0.10 | 15.00 | 0.35 |
| 22 | 0.20 | -15.00 | -0.06 |
| 23 | 0.20 | 0.00 | 0.20 |
| 24 | 0.20 | 15.00 | 0.45 |
| 25 | 0.30 | -15.00 | 0.04 |
| 26 | 0.30 | 0.00 | 0.30 |
| 27 | 0.30 | 15.00 | 0.54 |
| 28 | 0.40 | -15.00 | 0.15 |
| 29 | 0.40 | 0.00 | 0.40 |
| 30 | 0.40 | 15.00 | 0.62 |
| 31 | 0.50 | -15.00 | 0.26 |
| 32 | 0.50 | 0.00 | 0.50 |
| 33 | 0.50 | 15.00 | 0.71 |

Fig. 12

FEEDBACK CONTROL DEVICE

BACKGROUND OF THE INVENTION

The present invention relates to a control system intended for use with robots, plant and industrial facilities, and more particularly to a feedback control device which uses a sensor for feedback control of the state of a controlled object.

FIG. 1 is a block diagram of a conventional feedback control system. In FIG. 1, a controlled object 1, which is a machine, an object, a robot, or industrial equipment, outputs a controlled quantity. A converting unit 2 converts the controlled quantity output from the controlled object 1 to a feedback quantity suitable for comparison with a desired value or command for the control system. A control unit 4 amplifies or converts the difference between the desired value and the feedback quantity, which is a control deviation, to an actuating signal suitable for controlling an actuating unit 3. The activating unit 3 converts the actuating signal from the control unit 4 to a manipulated variable or control input for controlling the object 1.

In FIG. 1, the feedback control is performed in accordance with the following procedure. First, a controlled quantity is detected by the detecting unit 2 and then converted to a feedback quantity. Next, a comparison is made between the desired value and the feedback quantity to obtain the control deviation. In response to the sign and magnitude of the control deviation, the control unit 4 applies to the actuating unit 3 such an actuating signal as to reduce the control deviation. The actuating unit 3 applies the control input corresponding to the actuating signal to the controlled object 1, whereby a corrective operation is performed.

In order to make the controlled quantity of the controlled object 1 equal the desired value, the feedback control system feeds back the controlled quantity detected by the converting unit 2 to compare it with the desired value, and automatically performs the corrective operation by the actuating unit 3. The feedback control can lessen the influence of not only a disturbance, i.e., a variation in the controlled quantity other than a variation in the desired value but also a variation in a parameter such as the amplification of an amplifier used in the control system and allows the controlled quantity to correspond to the desired value.

The feedback control system aims to bring the value of the controlled quantity closer to the desired value as quickly as possible. However, in a conventional control device, if its gain is low, then the controlled quantity will not approach the desired value easily and, consequently, will result in a slow response. The actuating signal output from the control unit 4 of FIG. 1 is not necessarily a proper value because the output of the controlled object is generally delayed against the input. If, therefore, the gain of the control device is increased for quick-response control, then the stability of control will be lost and the controlled quantity will thus diverge or oscillate.

SUMMARY OF THE INVENTION

It is an object of the present invention to provide a feedback control device which provides both quick response and good stability.

It is another object of the present invention to provide a feedback control device which is excellent in both responsiveness and stability and permits multivariable control.

The present invention comprises detecting means for converting a controlled quantity output from a controlled object to a feedback quantity at a control time that is comparable with a desired value and, predictive control means responsive to the feedback quantity for obtaining a predicted feedback quantity at the next control time to produce an actuating signal that decreases difference, i.e. a deviation or an error between the predicted feedback quantity and the desired value. The present invention further comprises actuating means responsive to the actuating signal for providing a control input to the controlled object.

Accordingly, the controlled object is supplied with a control input which makes a feedback quantity at a control time after the controlled object has been controlled, closer to the desired value. This eliminates the detrimental effects of operational time delays associated with the control device or the controlled object and thus significantly improves the accuracy of control. Therefore, even if the responsibility of the control device is increased, it is possible to prevent the controlled quantity from producing instability such as oscillation or divergence. Consequently, quick response and good stability of control may be achieved.

The predictive control means 10 of the present invention is equipped with a layered neural network for predicting a feedback quantity at the next control time by way of example. The layered neural network comprises input-layer units supplied with a feedback quantity at the present control time and an input value corresponding to an actuating signal; output-layer units for outputting a predicted feedback quantity; and intermediate-layer units connecting the input-layer units and the output-layer units. The predictive control means corrects the input value corresponding to the actuating signal in such a way as to decrease the deviation between the predicted feedback quantity output from the neural network and the desired value at the present control time. Then the prediction control means outputs the corrected input value to the actuating unit. The amount of correction of the input value corresponding to the actuating signal can be obtained by, for example, a relaxation algorithm for propagating the deviation from the output layer back to the input layer as an error.

A predicted feedback quantity can be obtained with great accuracy by allowing the layered neural network to perform proper learning. The control based on an actuating signal which decreases the deviation between the predicted feedback quantity and the desired value can eliminate the instability of the controlled quantity output from the controlled object and bring the controlled quantity close to the desired value monotonically.

BRIEF DESCRIPTION OF THE DRAWINGS

FIG. 12 shows an example of learning data for the neural network of FIG. 11;

DETAILED DESCRIPTION OF THE PREFERRED EMBODIMENTS

Figure 1:
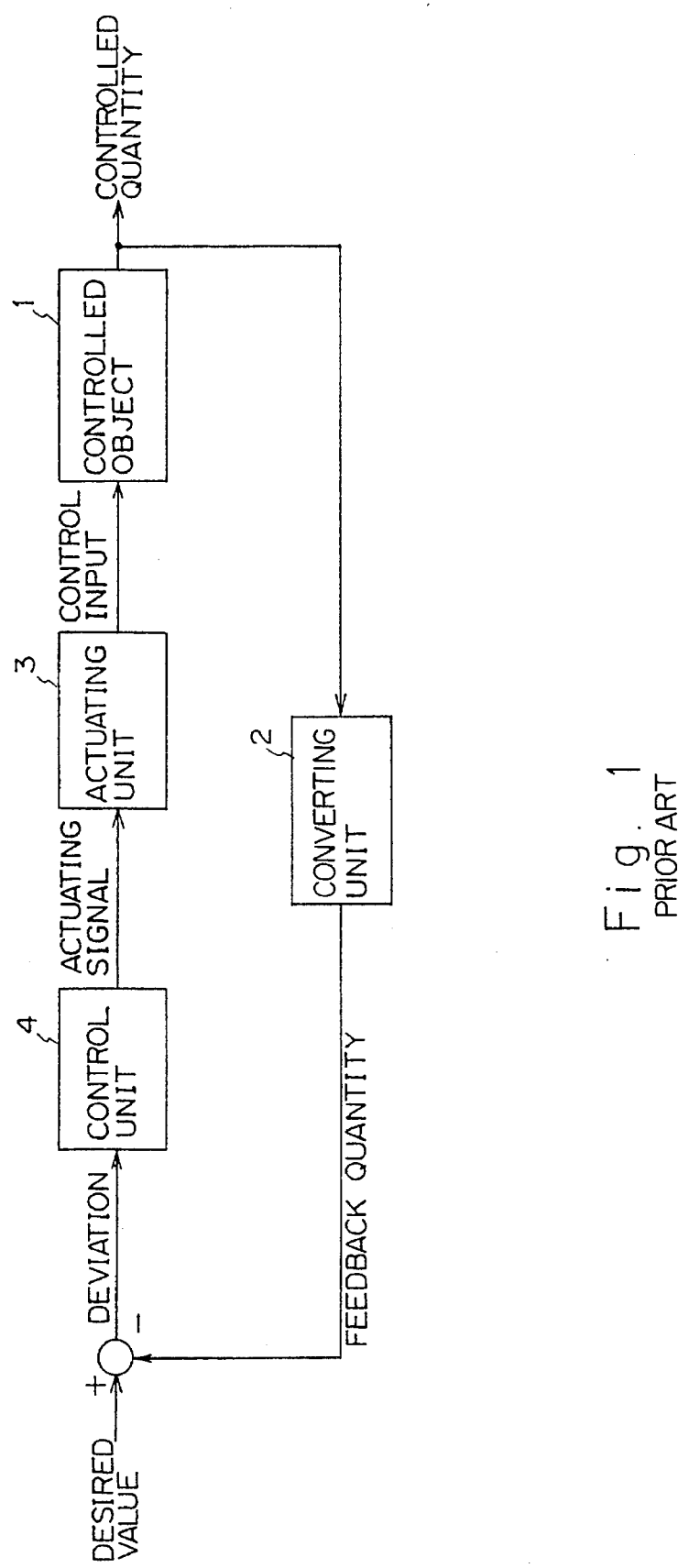
FIG. 1 is a block diagram of a conventional feedback control device.
Figure 2:
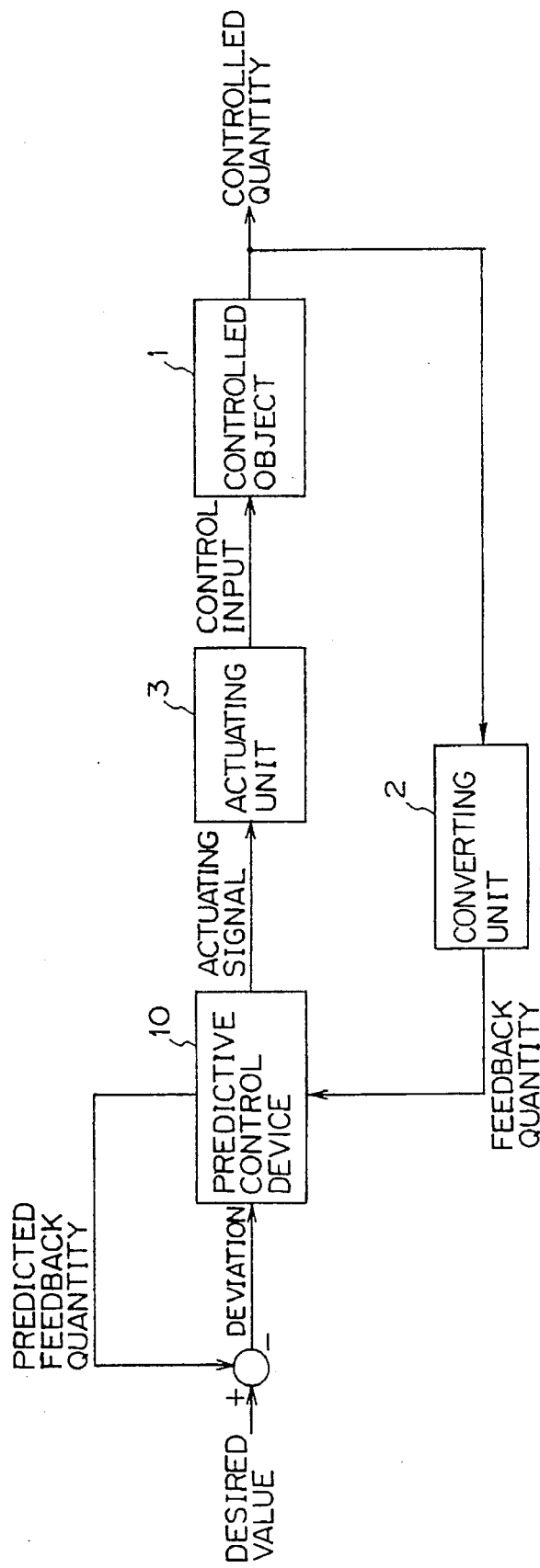
FIG. 2 is a block diagram of a feedback control device of the present invention

FIG. 2 is a block diagram of a feedback control device of the present invention. FIG. 2 shows a converting unit 2 for converting a controlled quantity output from a controlled object 1 to a feedback quantity that is comparable with a desired value and an actuating unit 3 which feeds a control input corresponding to an actuating signal to the controlled object 1.

A predictive control device 10 responds to a feedback quantity at the present control time output from the converting unit 2 to predict a feedback quantity at the next control time and outputs it as a predicted feedback quantity. Next, the difference between the value of the predicted feedback quantity and the desired value at the present control time, i.e., a deviation, is applied to the predictive control device 10. The predictive control device 10 thus obtains such an actuating signal to decrease the deviation and then outputs it to the actuating unit 3.

Figure 3:
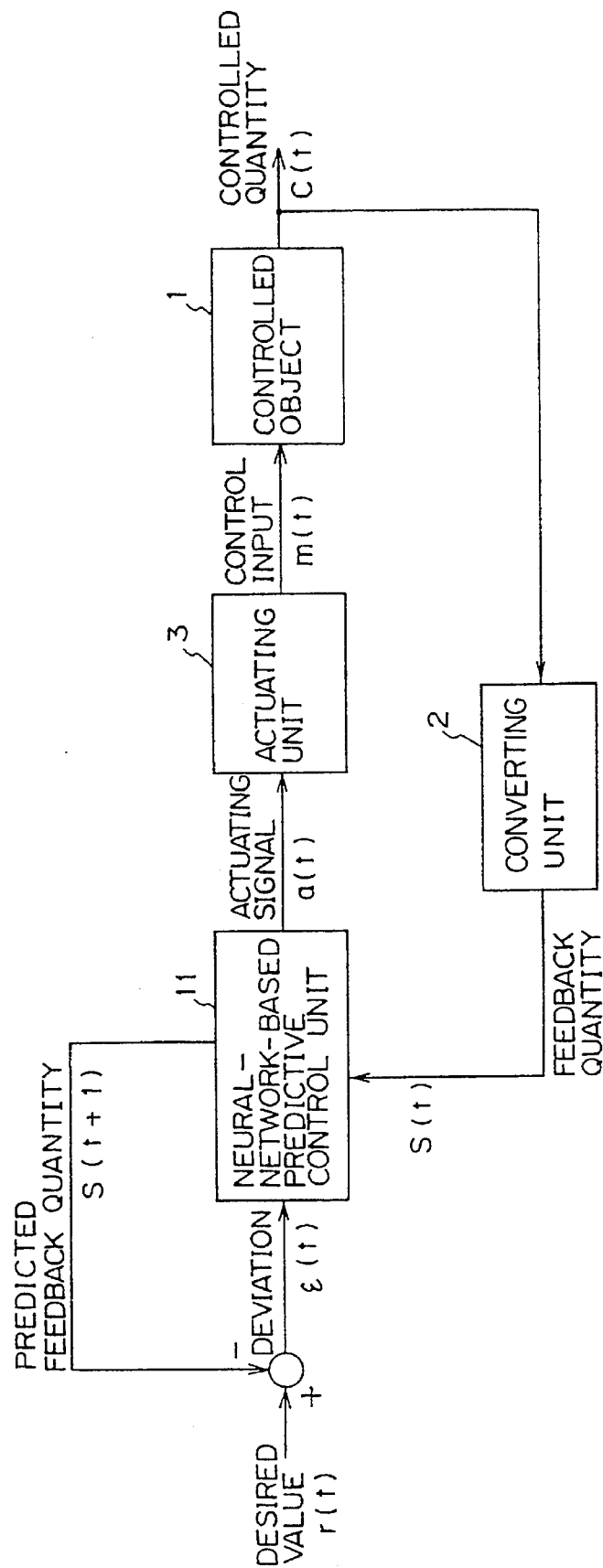
FIG. 3 is a block diagram of an embodiment of the feedback control device.

Referring now to FIG. 3, a feedback control device of the present invention in which a neural-network-based predictive control unit 11 is used as predictive control device 10 of FIG. 2 is shown. A controlled quantity C(t) of controlled object 1 is converted by converting unit 2 to a feedback quantity S(t) which is, in turn, input into the neural network-based predictive control unit 11.

Figure 4:
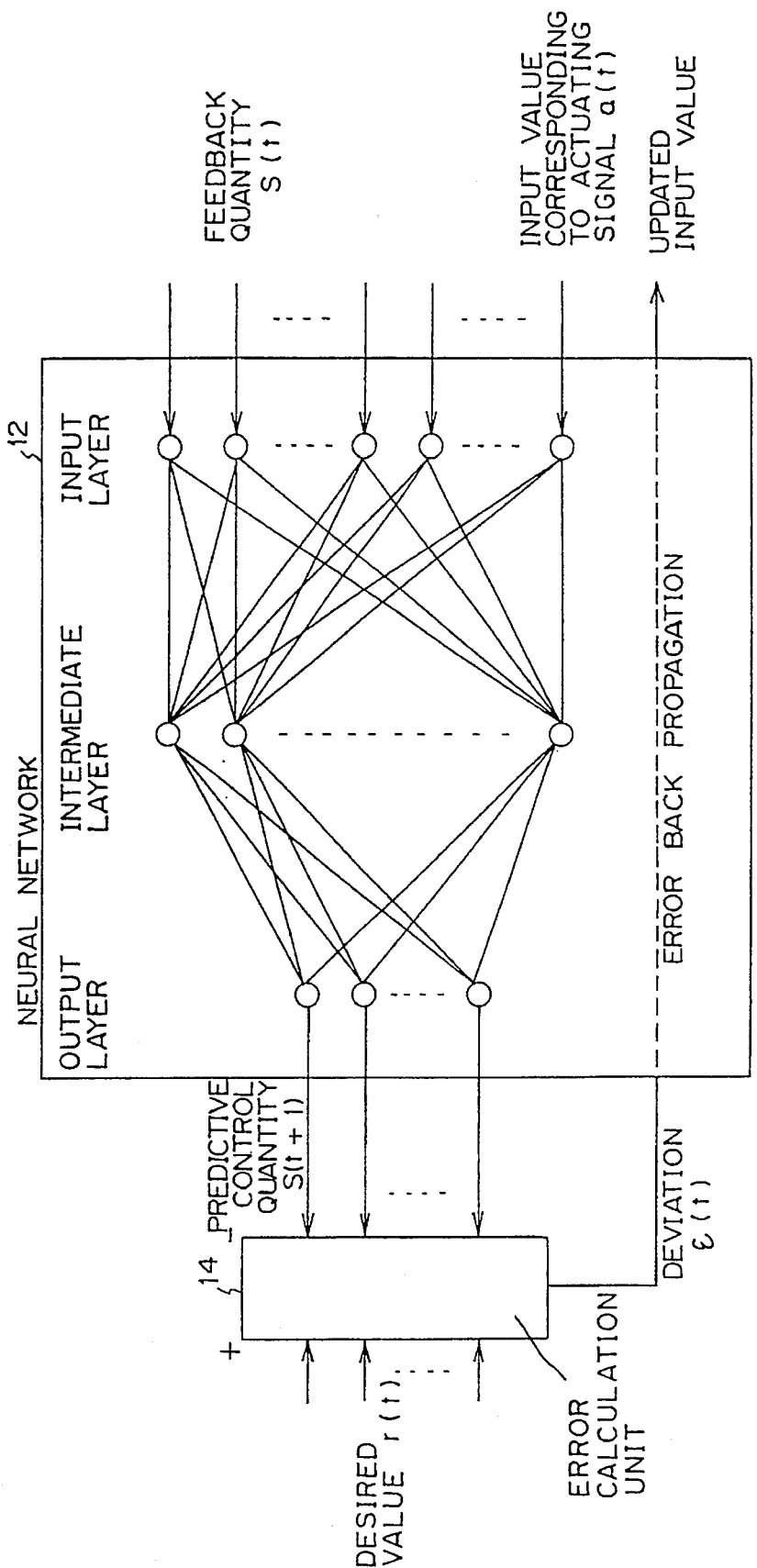
FIG. 4 shows an example of the neural network of FIG. 3.

FIG. 4 shows an example of the neural network in the neural-network-based predictive control unit 11. The neural network 12 of FIG. 4 is a layered neural network having input-layer units, intermediate-layer units, and output-layer units. The input-layer units are supplied with a feedback quantity S(t) at the present control time t output from the converting unit 2 and an input value corresponding to an actuating signal a(t) at that time. The output-layer units output a predicted feedback quantity S(t+1) at a control time t+1 subsequent to the present time t. It is assumed that the feedback quantity S(t), the input value corresponding to the actuating signal a(t), and the predicted feedback quantity S(t+1) are vector quantities.

In an error calculation unit 14, a comparison is made between the output of neural network 12, i.e., the predicted feedback quantity S(t+1) and a desired value r(t) in order to obtain the difference or deviation $\epsilon(t)$. The deviation $\epsilon(t)$ is back-propagated as an error through the neural network and then used to update the input value corresponding to the actuating signal a(t).

Figure 5:
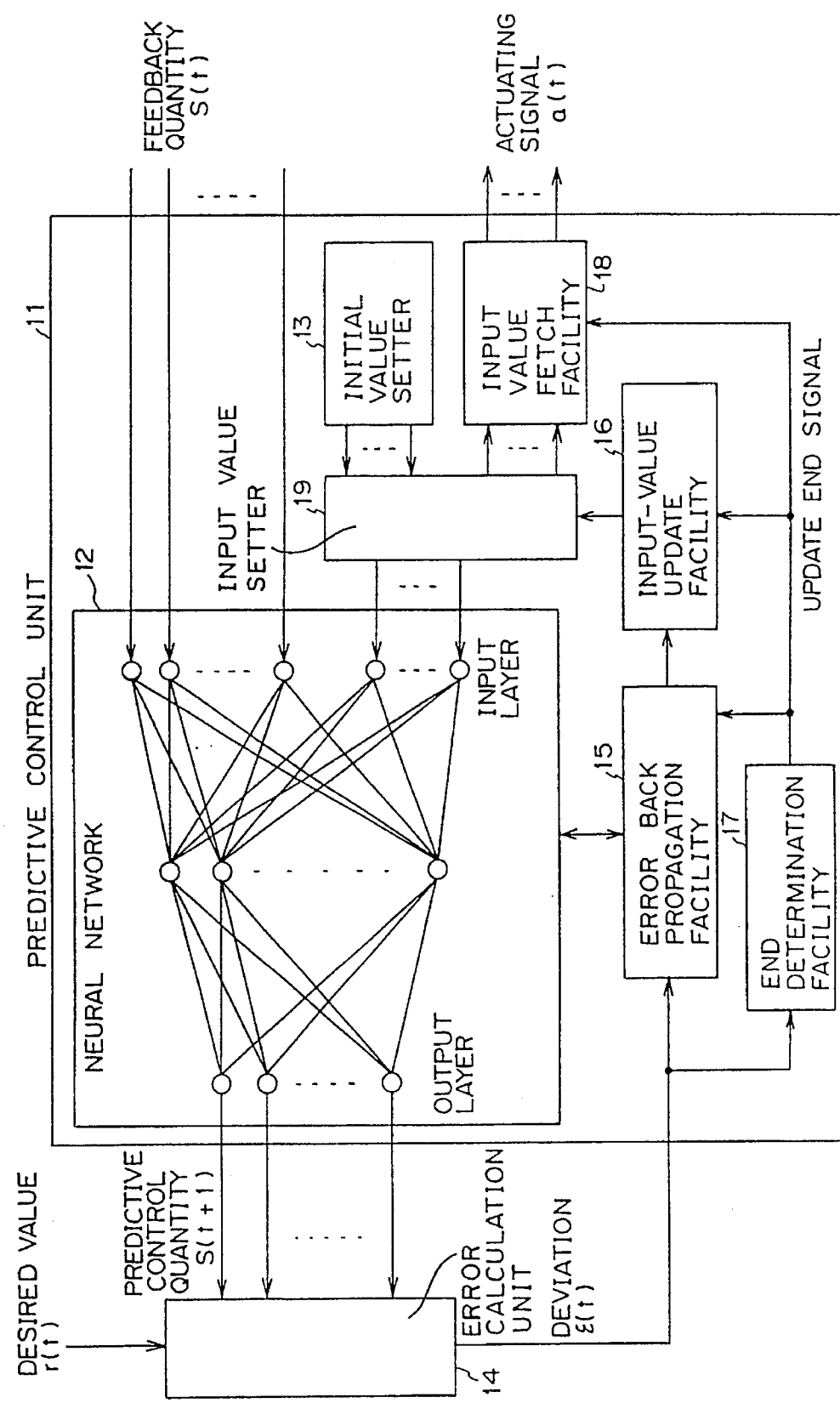
FIG. 5 is a block diagram of the predictive control unit including the neural network.

FIG. 5 is a detailed block diagram of the predictive control unit 11 which includes the neural network of FIG. 4. In the neural network 12 of FIG. 5, which is the same as that described in FIG. 4, some of the input-layer units are supplied with the feedback quantity S(t) from the converting unit 2 and the remaining input-layer units are supplied with an input value corresponding to an actuating signal a(t), set by an initial value setter 13, through an input value setter 19. The output-layer units output a predicted feedback quantity S(t+1) which is, in turn, compared with a desired value r(t) at the present time t by an error calculating unit 14 to produce a deviation $\epsilon(t)$. This deviation $\epsilon(t)$ is fed into an error back propagation facility 15 as an output-layer error. The error back propagation facility 15 back propagates the error through the neural network 12, and an input value update facility 16 updates the input value in the input value setter 19. For the output of the error calculating unit 14, however, an end determination facility 17 determines if end conditions have been met, for example, if the error has converged to within a certain value. If it has been determined that the end conditions have been met, then the end determination facility 17 provides an update end signal to the error back propagation facility 15, the input value update facility 16, and an input value fetch facility 18. The input value fetch facility 18 fetches an updated input value from the input value setter 19 for application to the actuating unit 3 of FIG. 3 as an actuating signal a(t). The actuating unit 3 feeds a control input m(t) corresponding to the actuating signal a(t) to the controlled object 1.

Figure 6:
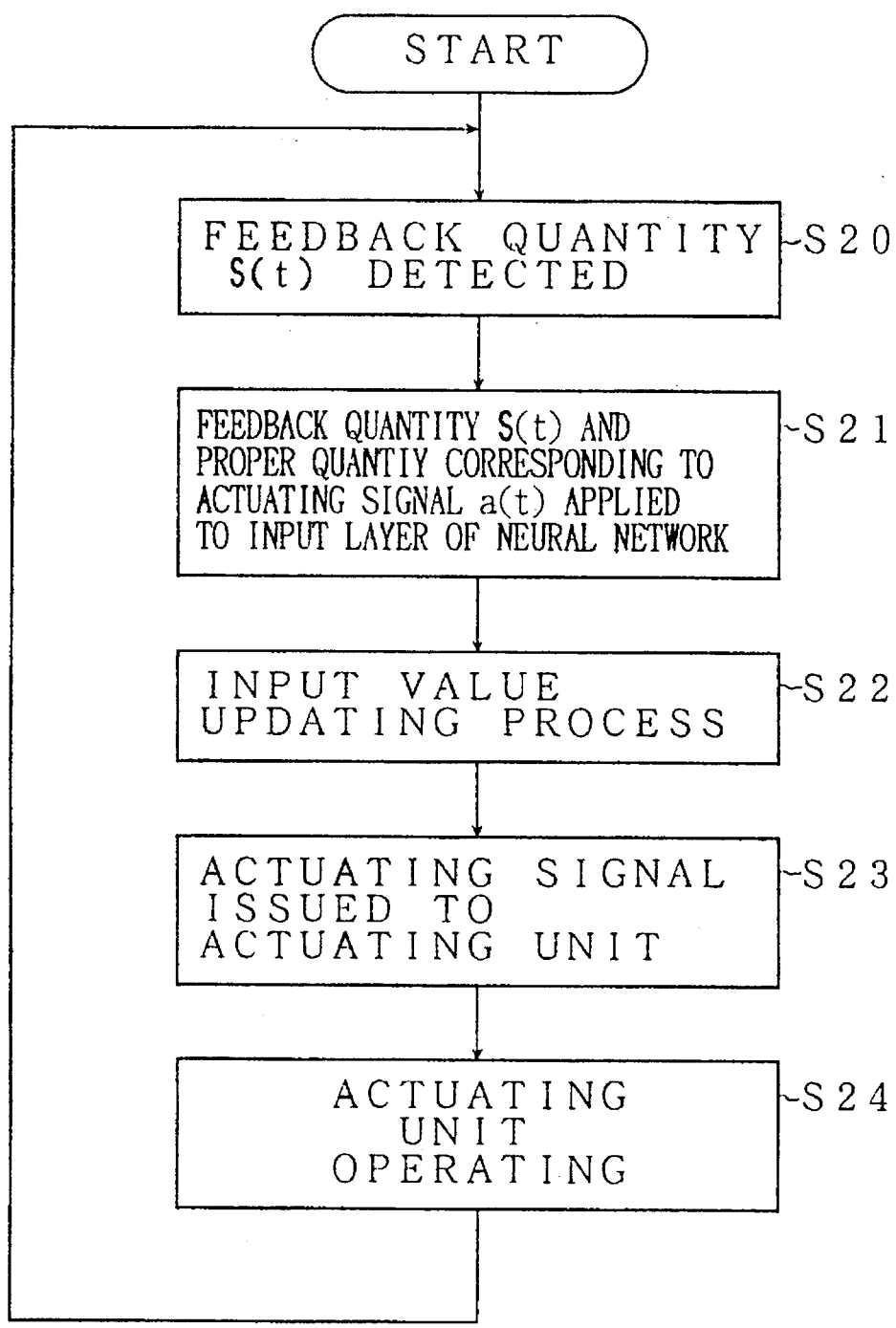
FIG. 6 is a flowchart for the overall processing performed by the feedback control device.

FIG. 6 is a flowchart for the overall processing performed by the feedback control device of the present invention. First, in step S20, a feedback quantity c(t) at the present time t is detected by the detecting unit and converted to a feedback quantity S(t). In subsequent step S21, the input-layer units of the neural network 12 of FIG. 5 are supplied with the detected feedback quantity S(t), and a proper initial value of the input value corresponding to the actuating signal a(t), for example, 0. In subsequent step S22, the input value, e.g., 0, set by the input value setter 19 is updated. This process of updating the input value will be described later.

At the termination of the input update processing in step S22, the input value fetch facility 18 of FIG. 5 outputs an actuating signal to the actuating unit 3 in step S23. In subsequent step S24, the actuating unit operates, whereby a control operation at the control time t is terminated. Subsequently, the process is repeated from step S20.

Figure 7:
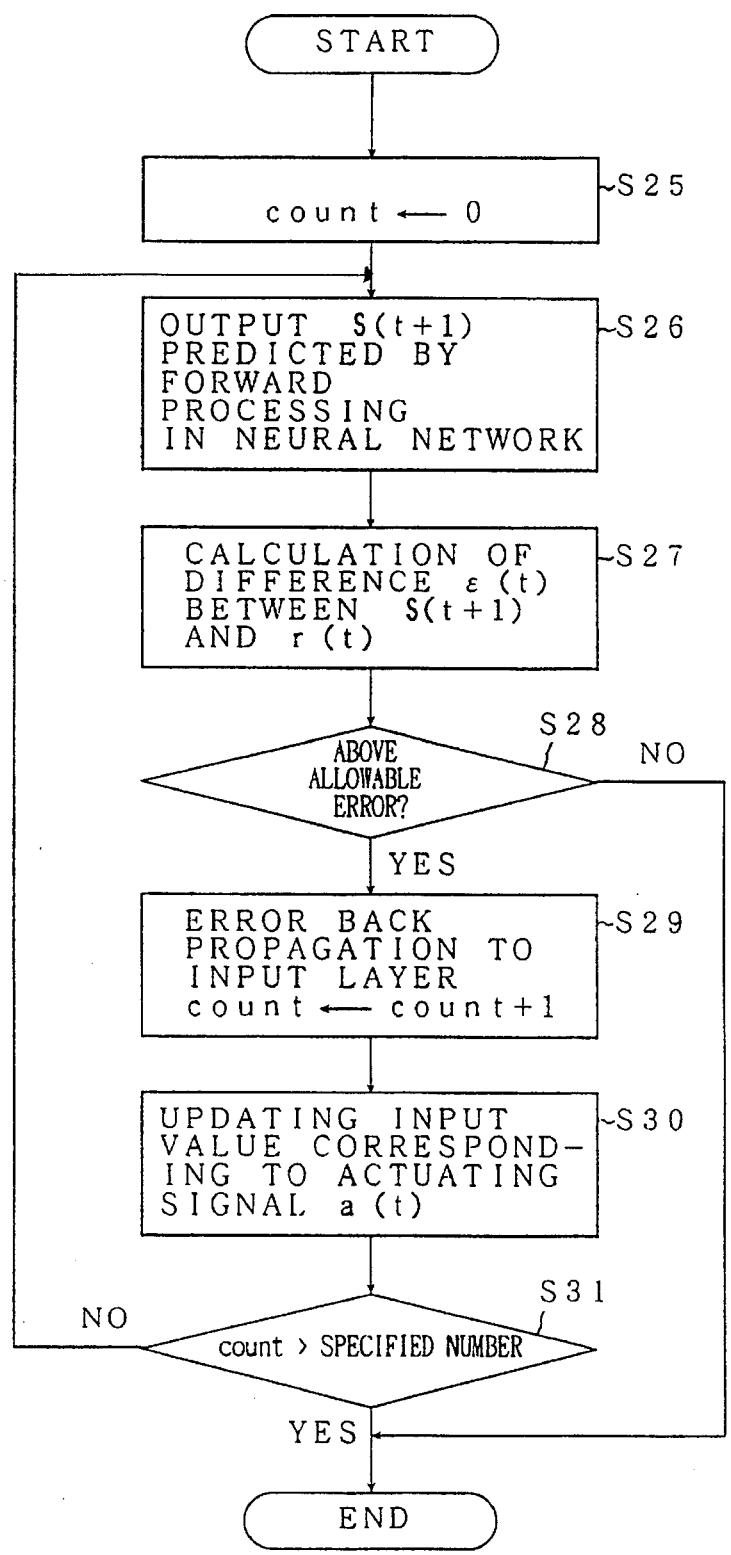
FIG. 7 is a detailed flowchart for the input-value update processing.

FIG. 7 is a detailed flowchart for the input value updating process in step S22 of FIG. 6. First, in step S25, a count indicating the number of input updating operations is initialized to 0. In subsequent step S26, a predicted feedback quantity S(t+ 1) is output by the forward processing in the neural network 12 for the input which has been applied to the input-layer units in step S21 of FIG. 6. In subsequent step S27, the difference $\epsilon(t)$ between the predicted feedback quantity S(t+1) and the desired value r(t) at the present time is calculated.

In subsequent step S28, a determination is made as to whether or not $\epsilon(t)$ is above the allowable error. If $\epsilon(t)$ is above the allowable error, then $\epsilon(t)$ is back propagated to the input-layer units as an error and the count is incremented by one in step S29. In subsequent step S30, the input value, corresponding to the actuating signal a(t) input to the input-layer units is updated. In subsequent step S31, a determination is made as to whether or not the count value has exceeded a specified number of times the input value is updated. If the count value is below the specified number, then the process is repeated from step S26. If it is determined in step S28 that $\epsilon(t)$ is not above the allowable error and if it is determined in step S31 that the count value has exceeded the specified number, then the process terminates.

Figure 8A:
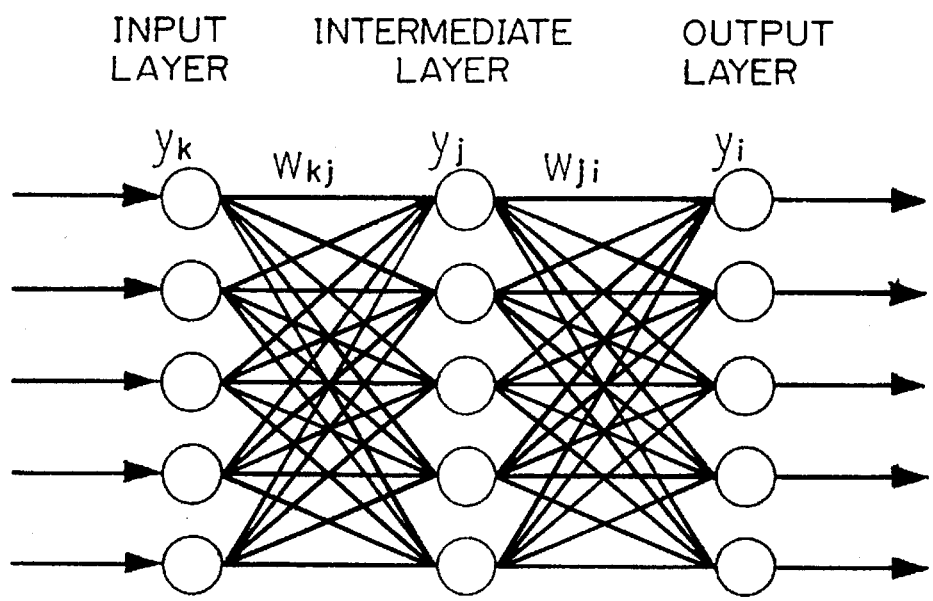
FIG. 8A is a diagram for use in explanation of a layered neural network.

FIG. 8A is a diagram illustrating the layered neural network shown in FIGS. 4 and 5. The updating of the input value corresponding to the actuating signal to the input-layer units will be described with reference to FIG. 8A.

Let E represent an error function and $y_i$, $y_j$ and $y_k$ represent output values of an output-layer unit i, an intermediate-layer unit j and an input-layer unit k, respectively. In addition, let $w_{ji}$ represent a weight of coupling from the intermediate layer to the output layer and $w_{kj}$ represent a weight of coupling from the input layer to the intermediate layer as shown in FIG. 8A. Consider here a network in which the units are completely coupled among the layers as in FIG. 8A.

In general, the error back propagation method corrects weights in such a way as to make the error function E small. In the present invention, however, a relaxation algorithm is used to correct an input value in such a way as to make the error function E small.

At this point, since the input value to the input-layer unit k is equal to its output value $y_k$, the amount of correction for the input value, i.e., the amount of correction for the output value $y_k$, is given, from the steepest descent method, by $$\Delta y_k = -\lambda \frac{\partial E}{\partial y_k} = -\lambda \delta_k \tag{1}$$

where $\lambda$ is a constant.

In the same manner as the error back propagation method, changes in error for the output are derived in sequence from the output layer. First, a change in error for the output value $y_i$ of the output-layer unit i is given by $$\delta_i = \frac{\partial E}{\partial y_i} \tag{2}$$

Next, a change in error for the output value $y_j$ of the intermediate-layer unit j is given by $$\delta_j = \sum_i \frac{\partial E}{\partial y_i} \frac{\partial y_i}{\partial y_j} \tag{3}$$

Figure 8B:
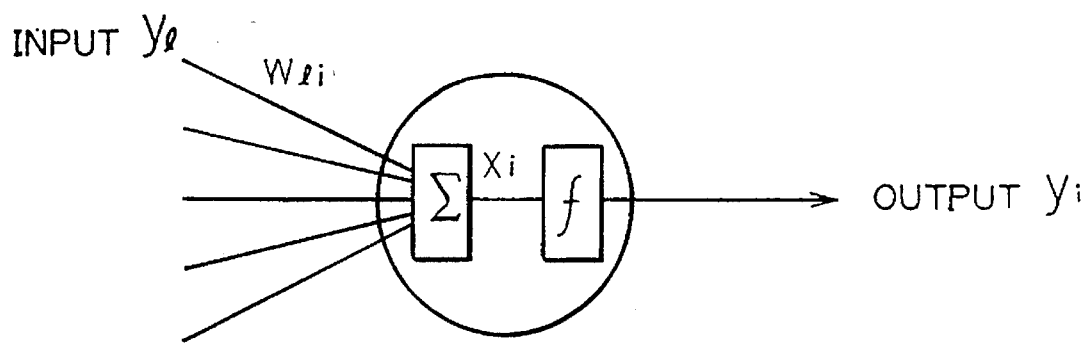
FIG. 8B shows a relationship between inputs and an output of a unit i in the neural network.

Assume here that, as shown in FIG. 8B, the output value $y_i$ of the output-layer unit i is obtained from output values $y_1$ of the intermediate-layer units 1 as follows:

$$y_i = f(x_i) \tag{4}$$

$$x_i = \Sigma_l y_1 w_{1i} \tag{5}$$

where f(x) is an output function of the unit i and $w_{1i}$ is the weight of coupling from the unit 1 to the unit i. Then expression (3) is rewritten by $$\begin{aligned}
\delta_j &= \sum_i \frac{\partial E}{\partial y_i} \frac{\partial f(x_i)}{\partial y_j} \\
&= \sum_i \frac{\partial E}{\partial y_i} \frac{\partial f(x_i)}{\partial x_i} \frac{\partial \sum_i y_1 w_{1i}}{\partial y_j} \\
&= \sum_i \delta_i f'(x_i) w_{ji}
\end{aligned} \tag{6}$$

A change in error for the output value $y_j$ of the intermediate-layer unit is thus obtained. For the input-layer unit as well, a change in error with respect to a change of the input-layer unit output can be obtained through the same calculation using the weight $w_{kj}$ and the output function f(x) as follows.

$$\begin{aligned}
\delta_k &= \sum_j \delta_j f'(x_j) w_{kj} \\
&= \sum_j \left[ \sum_i \delta_i f'(x_i) w_{ji} \right] f'(x_j) w_{kj}
\end{aligned} \tag{7}$$

For a layered neural network with more than three layers, the same calculations can be repeated to obtain a change in error $\delta_k$ for the output value $y_k$ of the input-layer unit.

Consider here that the error function E is defined, as usual, by the sum of squares of the differences between the output values $y_i$ and the desired values $d_i$.

Assume that the error function E is given by $$E = \frac{1}{2} \sum_i (d_i - y_i)^2 \tag{8}$$

Then, a change in error in the output unit will be given by $$\delta_i = \frac{\partial E}{\partial y_i} = y_i - d_i \tag{9}$$

By calculating the changes of error in sequence from the output layer to the input layer according to equations (9), (6) and (7), the amount of correction $\Delta y_k$ for the input value can be obtained. If the output function of each unit comprising the neural network is the sigmoid function given by $$f(x) = \frac{1}{1 + e - x} \tag{10}$$

then its differentiation will be given by $$f'(x_i) = f(x_i)(1 - f(x_i)) = y_i(1 - y_i) \tag{11}$$

The right-hand sides of equations (6) and (7) can be calculated using $y_i$ and $y_j$.

As described above, the back propagation of the error from the output layer to the input layer permits the input value of the input-layer units to be updated so that the value of the error function E of the output layer will decrease monotonically.

In other words, the control device using the present relaxation algorithm can generate an actuating signal which causes the deviation between the predicted feedback quantity and the desired value to decrease monotonically.

Figure 9A:
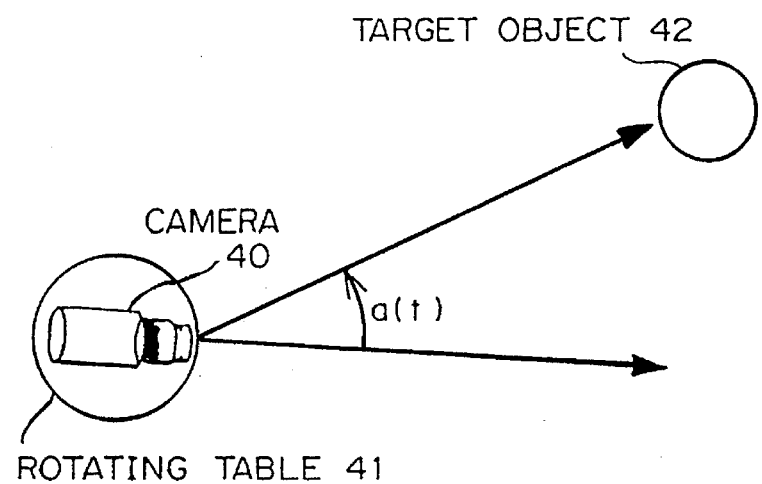
FIG. 9A shows a controlled object in an embodiment of the present invention.
Figure 9B:
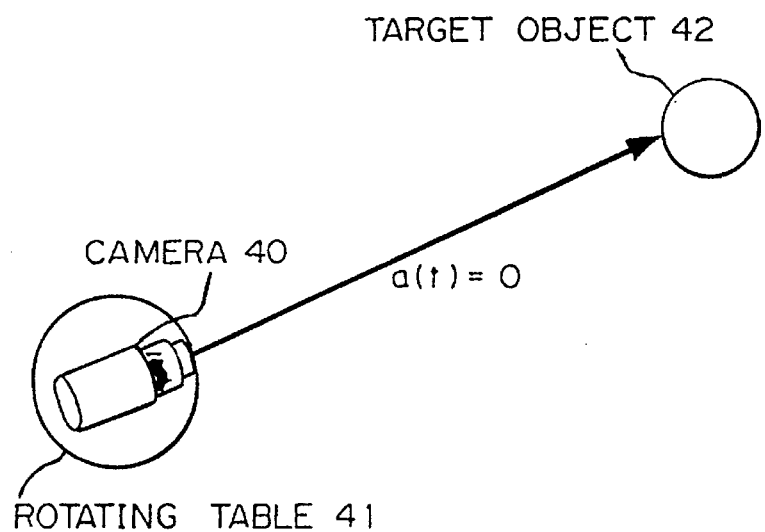
FIG. 9B shows a final goal of control in the embodiment of the present invention.

Next, reference will be made to FIG. 9A illustrating a specific example to describe the embodiment of the present invention in more detail. In FIG. 9A, a camera 40 is mounted on a rotating table 41, which is equipped with an actuator that permits the table to rotate in the horizontal plane. By rotating the table 41, control is performed in such a way as to directly point the camera 40 toward a target object 42, or, more specifically, in such a way that the relative angle $\alpha(t)$ between the direction in which the camera 40 points and the direction of the target object 42 becomes 0 degrees as shown in FIG. 9B.

In FIG. 9A, an amount of correction for the relative angle α(t) is applied to the actuator as an actuating signal for rotating the table 41. This rotates the table 41 to change the direction of the camera 40. The environment composed of the camera 40 and the target object 42 corresponds to the controlled object 1. A visual sensor, serving as means of observing the controlled object, detects the coordinates of the center of gravity of the target object 42 on the plane of projection of the camera 40. The visual sensor thus acts as the detecting unit 2. The purpose of control is to bring the coordinate of the target object 42 on the plane of projection which are detected by the visual sensor to a specified point, for example, the center of the plane of projection of the camera 40.

Figure 10:
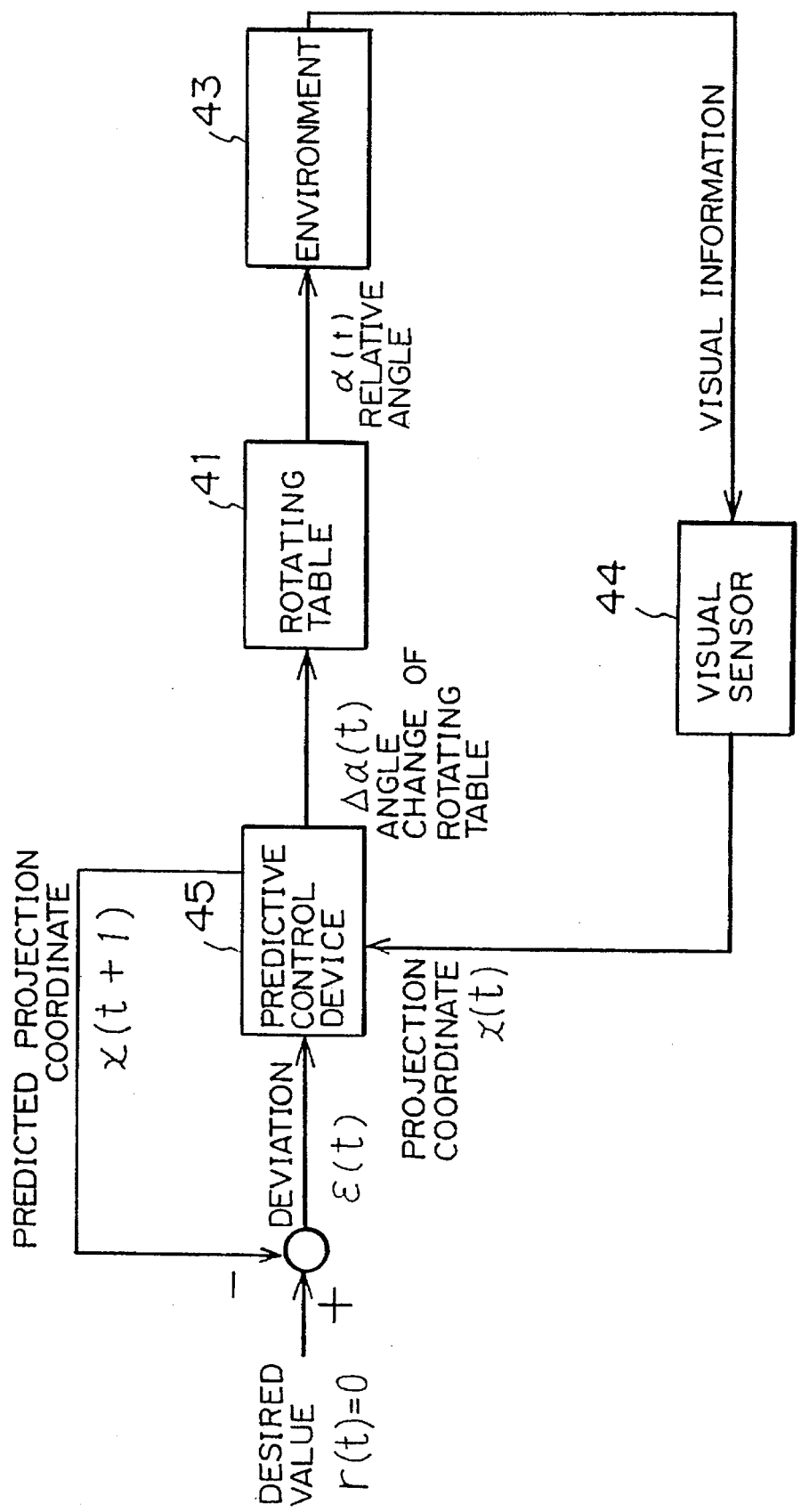
FIG. 10 is a block diagram of a feedback control device of the present invention for the controlled object of FIG. 9A.

FIG. 10 is a block diagram of a control system for the example of FIG. 9A. Comparing between FIG. 10 with FIG. 3, the environment 43 FIG. 10, comprising of the camera 40 and the target object 42 corresponds to the controlled object 1, while the rotating table 41 corresponds to the actuating unit 3 of FIG. 3. The visual sensor 44 of FIG. 10, adapted to detect the coordinate of the center of gravity of the target object 42 on the plane of projection of the camera as projection coordinate x(t), corresponds to the converting unit 2 of FIG. 3. A predictive control device 45 of FIG. 10, corresponding to the predictive control unit 11 of FIG. 3, outputs predicted projection coordinate x(t+1) at the next control time as a predicted feedback quantity and applies an activation signal to the rotating table 41, which permits the deviation ε(t) between the predicted projection coordinate x(t+1) and the desired value r(t) to decrease, i.e., an angle change of the rotating table Δα(t). Since the rotation of the rotating table 41 changes the relative angle α(t) and consequently the environment 43 changes, the relative angle α(t) corresponds to a control input m(t). The visual information the visual sensor 44 obtains from the environment 43 corresponds to a controlled quantity c(t). In order for the projection coordinate of the target object 42 to agree with the center, i.e., the origin of the plane of projection of the camera, control is performed such that r(t)=0.

Figure 11:
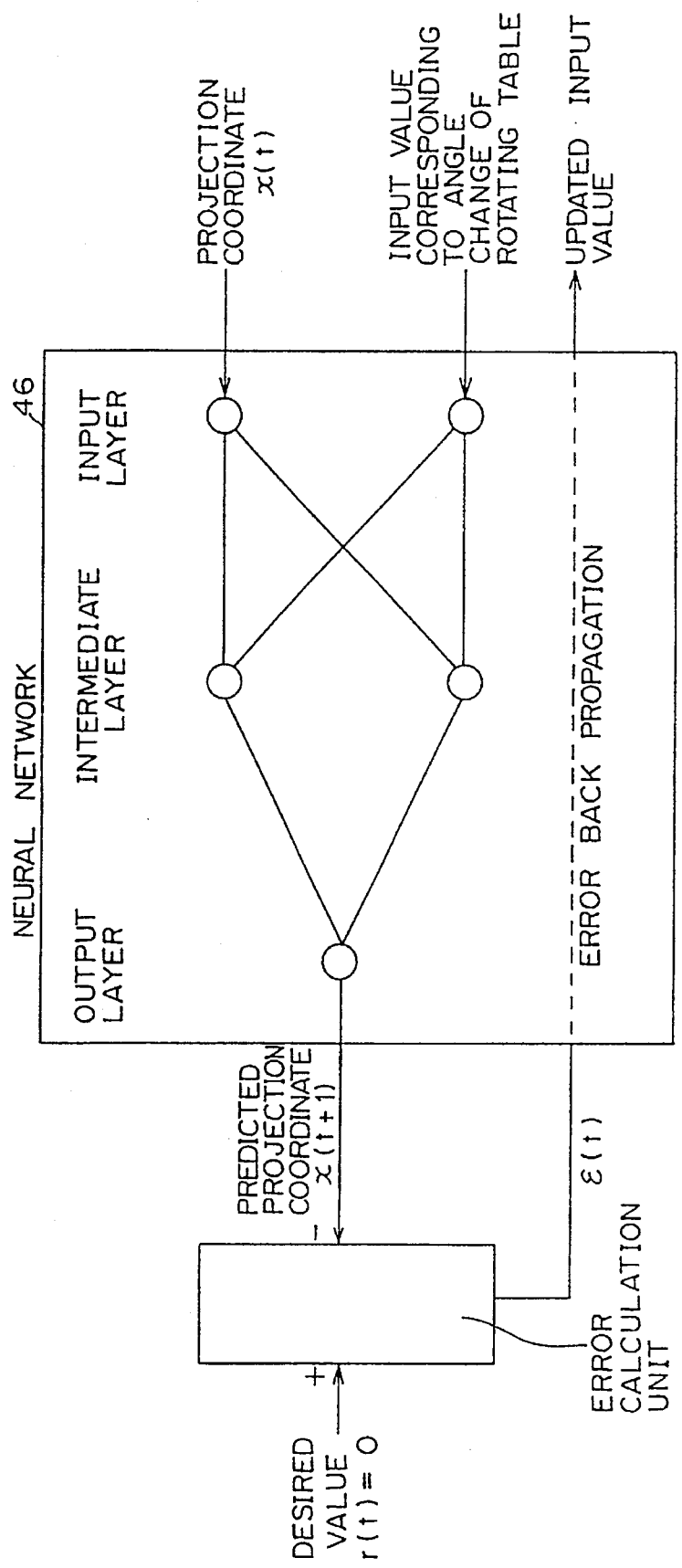
FIG. 11 shows an arrangement of the neural network used in the feedback control device of FIG. 10.
Figure 13:
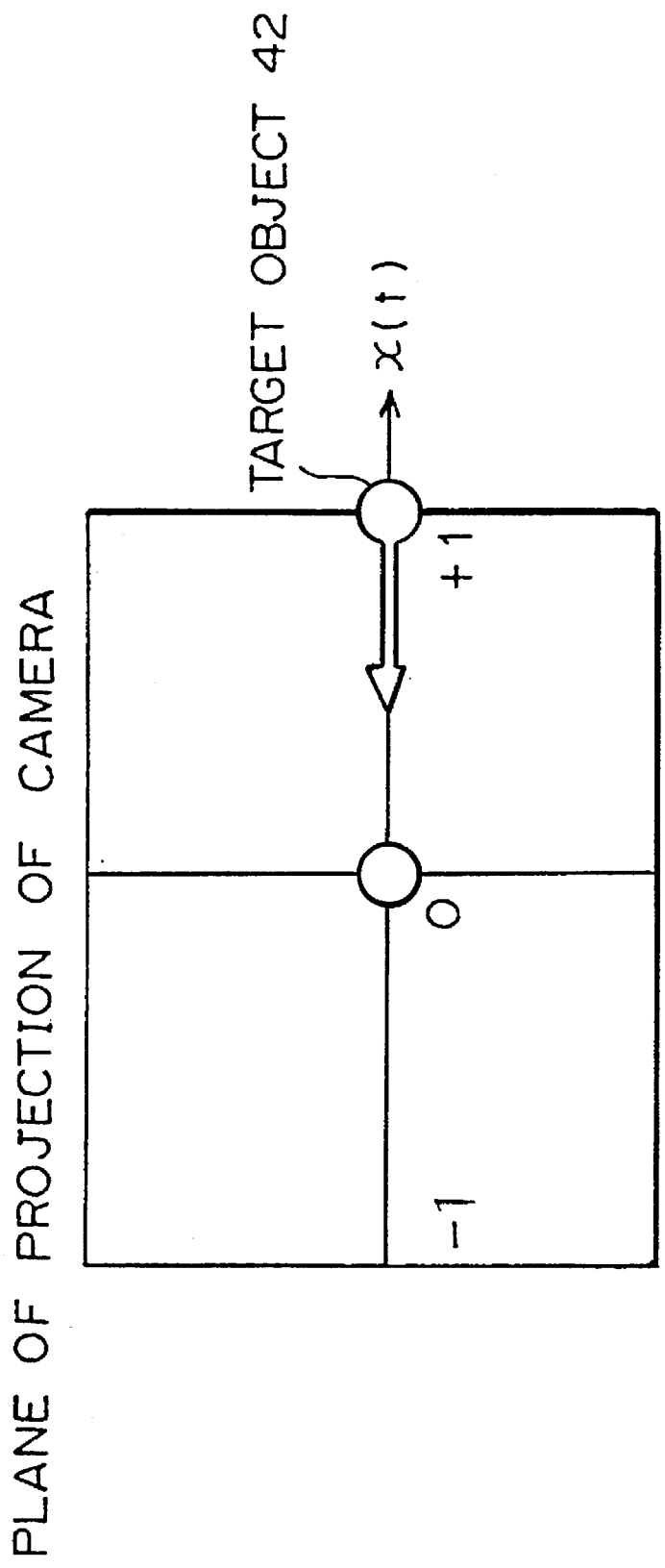
FIG. 13 is a diagram for use in explanation of control of the controlled object of FIG. 9A after learning.

FIG. 11 is a block diagram of a neural network used in the predictive control device 45. In this neural network 46, of two input-layer units, one is supplied with projection coordinate x(t) of the target object output from the visual sensor 44 and the other is supplied with an appropriate initial value corresponding to an angle change of the rotating table Δα(t). A single output-layer unit outputs predicted projection coordinate x(t+1). The input value corresponding to the angle change of the rotating table Δα(t) is updated through error back propagation so as to reduce the deviation ε(t). At the termination of updating, an updated input value is output as an angle change of the rotating table Δα(t) in FIG. 10.

The results of control simulation for the specific example of FIG. 9A will be described next. In FIG. 9A, the relative angle α(t) between the direction of the camera 40 and the direction of the target object 42 and the projection coordinate x(t) of the target object 42 are related by $$x(t)=\sin\{\alpha(t)\} \qquad (12)$$

When the table 41 is rotated through an angle of Δα(t), the projection coordinate of the target will be given by $$x(t+1)=\sin[\sin^{-1}\{x(t)\}+\Delta\alpha(t)] \qquad (13)$$

In the present embodiment, the projection coordinate of the target object lies in the range from −1 to +1, and an angle change of the rotating table at a time is limited to within the range from −15 to +15 degrees.

FIG. 12 shows an example of learning data for the neural network 46. This example shows 33 sets of learning data representing projection coordinate at the next control time, i.e., predicted projection coordinate x(t+1) when the projection coordinate x(t) of the target object on the plane of projection of the camera is changed from −0.5 to +0.5 in 0.1 steps, and −15 degrees, 0 degrees, and +15 degrees are specified in turn as an angle change of the rotating table at each of the projection coordinates.

Figure 14:
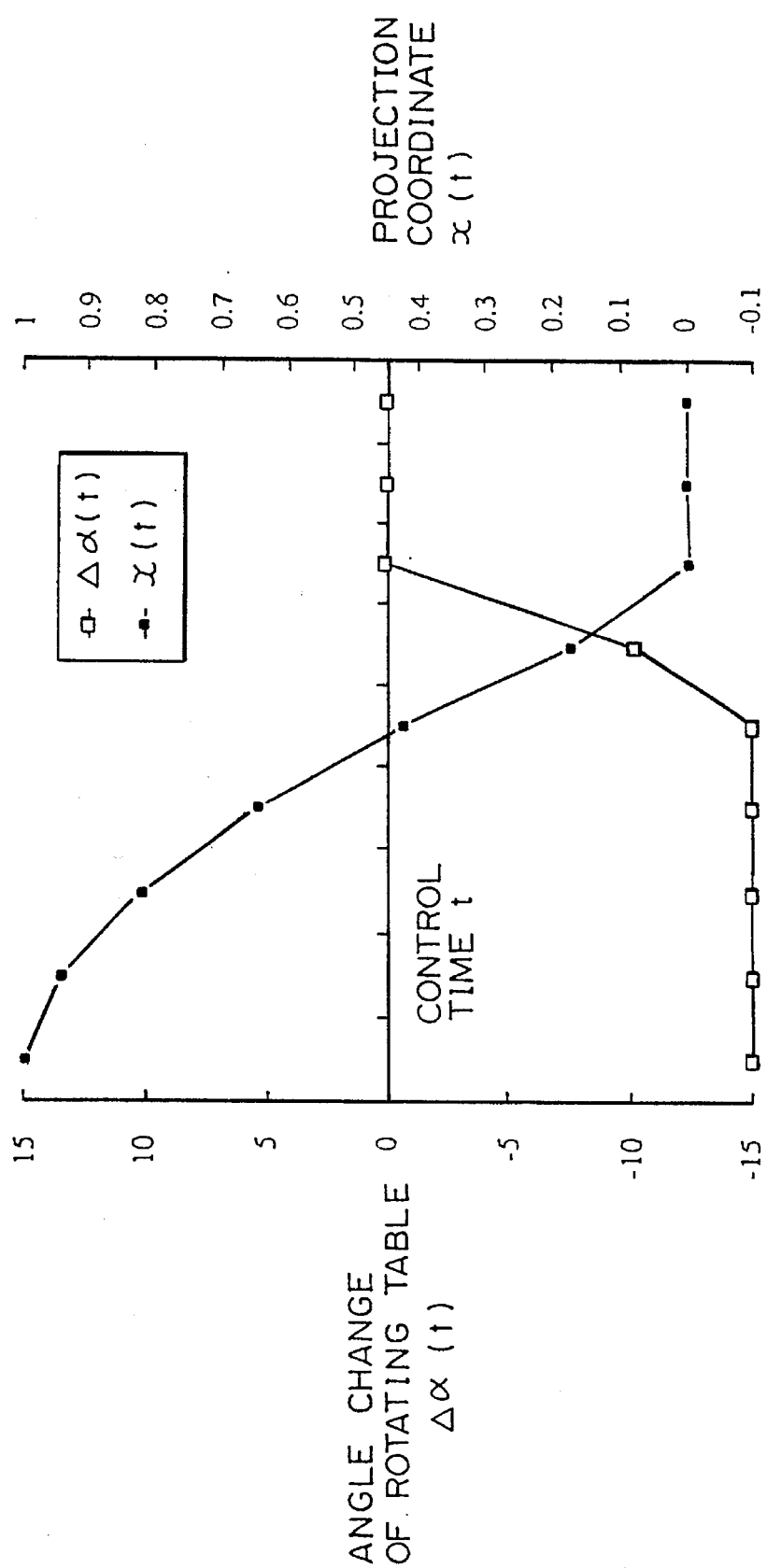
FIG. 14 shows a result of control by the feedback control device of FIG. 10.
Figure 15:
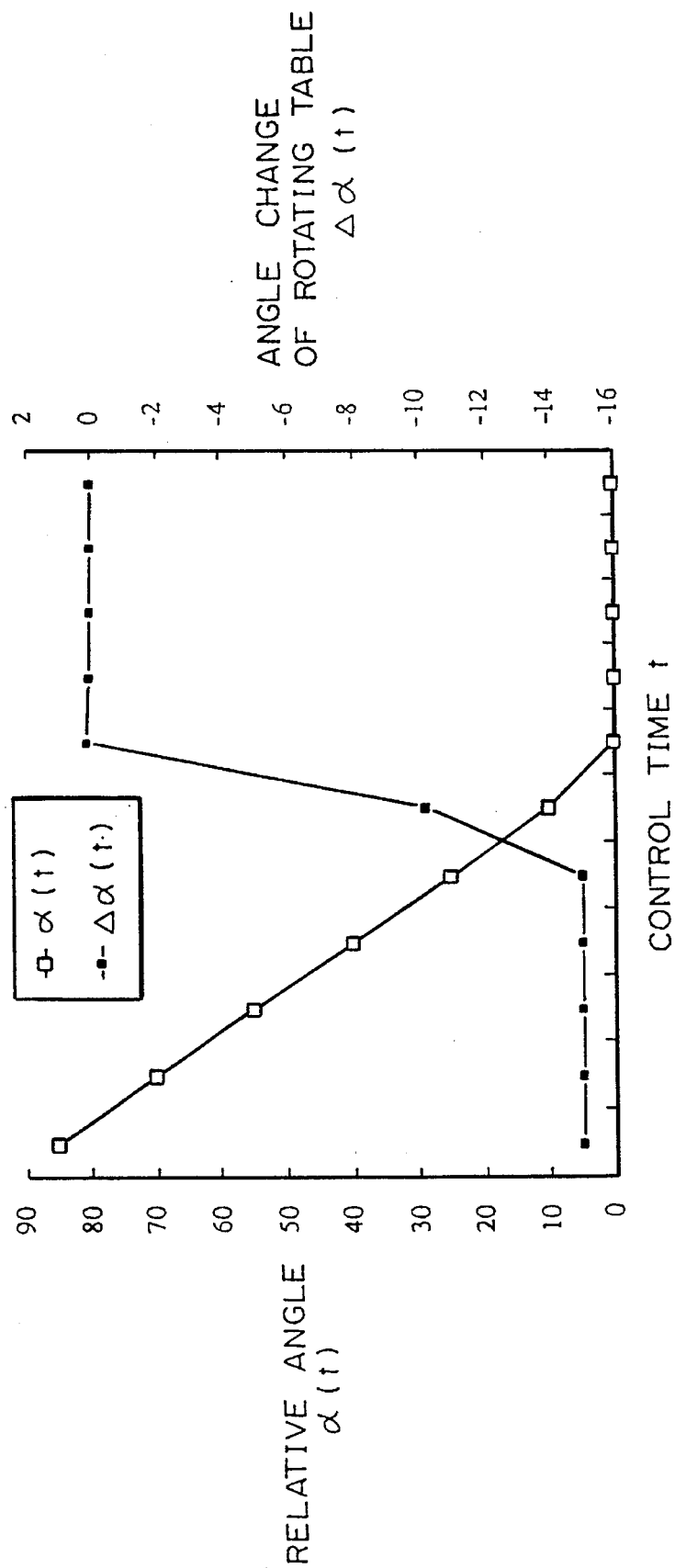
FIG. 15 shows a result of control by the feedback control device of FIG. 10.

The neural network 46 of FIG. 11 was caused to learn the data of FIG. 12. After the termination of the learning, control was performed toward the state in which α(t)=0 and x(t)=0 starting with the initial conditions under which the center of gravity of the object was positioned in the neighborhood of +1 on the plane of projection and the angle α(t) between the direction of the camera and the direction of the target object was 85 degrees. FIGS. 14 and 15 show the results of the control. FIG. 14 shows changes in projection coordinate x(t) relative to angle change of the rotating table Δα(t). As seen from FIG. 14, the projection coordinate approaches 0 with a limit angle change of −15 degrees applied at the first five control times. FIG. 15 shows how the relative angle α(t) between the camera and the target object changes with the angle change Δα(t). From FIGS. 14 and 15 it is understood that the projection coordinate x(t) and the relative angle α(t) are controlled properly without occurrence of oscillation.

Next, a description will be made of still another embodiment in which a spring is attached to the rotating table 41 in the embodiment of FIG. 9A. A block diagram of the control system in this case is the same as that of FIG. 10. The camera 40 and the target object 42 constitutes the environment 43 which is a controlled object. Visual information from the environment 43 is detected by the visual sensor 44, which inputs the projection coordinate x(t) of the center of gravity of the target object 42 on the plane of projection of the camera to the predictive control unit 45 as a feedback quantity. In the predictive control unit 45, the neural network that is the same as that of FIG. 11 outputs a predicted projection coordinate x(t+1), and an angle change of the rotating table Δα(t) which decreases the deviation ε(t) between the predicted projection coordinate x(t+1) and the desired value r(t) is obtained by the relaxation algorithm. When the angle change Δα(t) is applied to an actuator for rotating the table 41 as an actuating signal, the relative angle α(t) between the camera 40 and the target object 42 changes, and the environment 43 then outputs new visual information.

In this embodiment, the spring pulls the rotating table 41 when the camera 41 does not directly face the target object 42. It is supposed that, when the rotating table is rotated through Δα(t), the projection coordinate is given by $$x(t+1)=\sin[\sin^{-1}\{x(t)\}+\Delta\alpha(t)+0.1x(t)] \qquad (14)$$

As in the case of FIG. 9A, the projection coordinate x(t) and the relative angle α(t) are related by the equation (12).

The learning data for the neural network is created by the use of equation (14) in the following ranges:

$$-1.0 \leq x(t) \leq 1.0 \qquad (15)$$

$$-30° \leq \Delta\alpha(t) \leq 30° \qquad (16)$$

Figure 16:
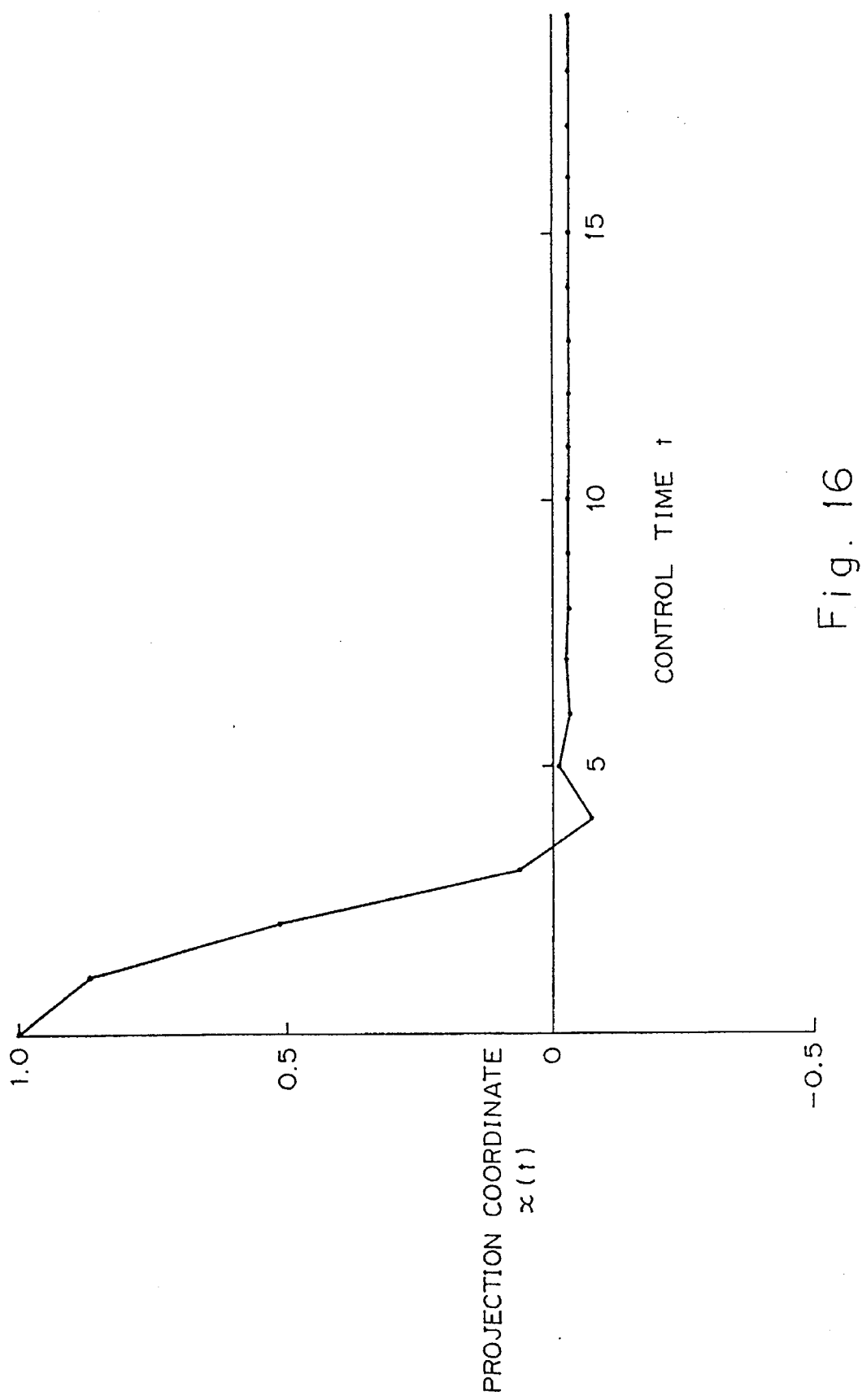
FIG. 16 shows a result of control in another embodiment of the present invention.

Control simulation is carried out using the neural network which had learns the learning data thus created. The goal of control is to cause the camera 40, which at control time t=0 points in a direction that makes an relative angle α(0) of 90 degrees with the direction of the target object 42, to directly face the target object 42. FIG. 16 shows the result of the control. From FIG. 16 it is understood that the projection coordinate x(t) converges to the desired value r(t)=0 quickly.

Figure 17:
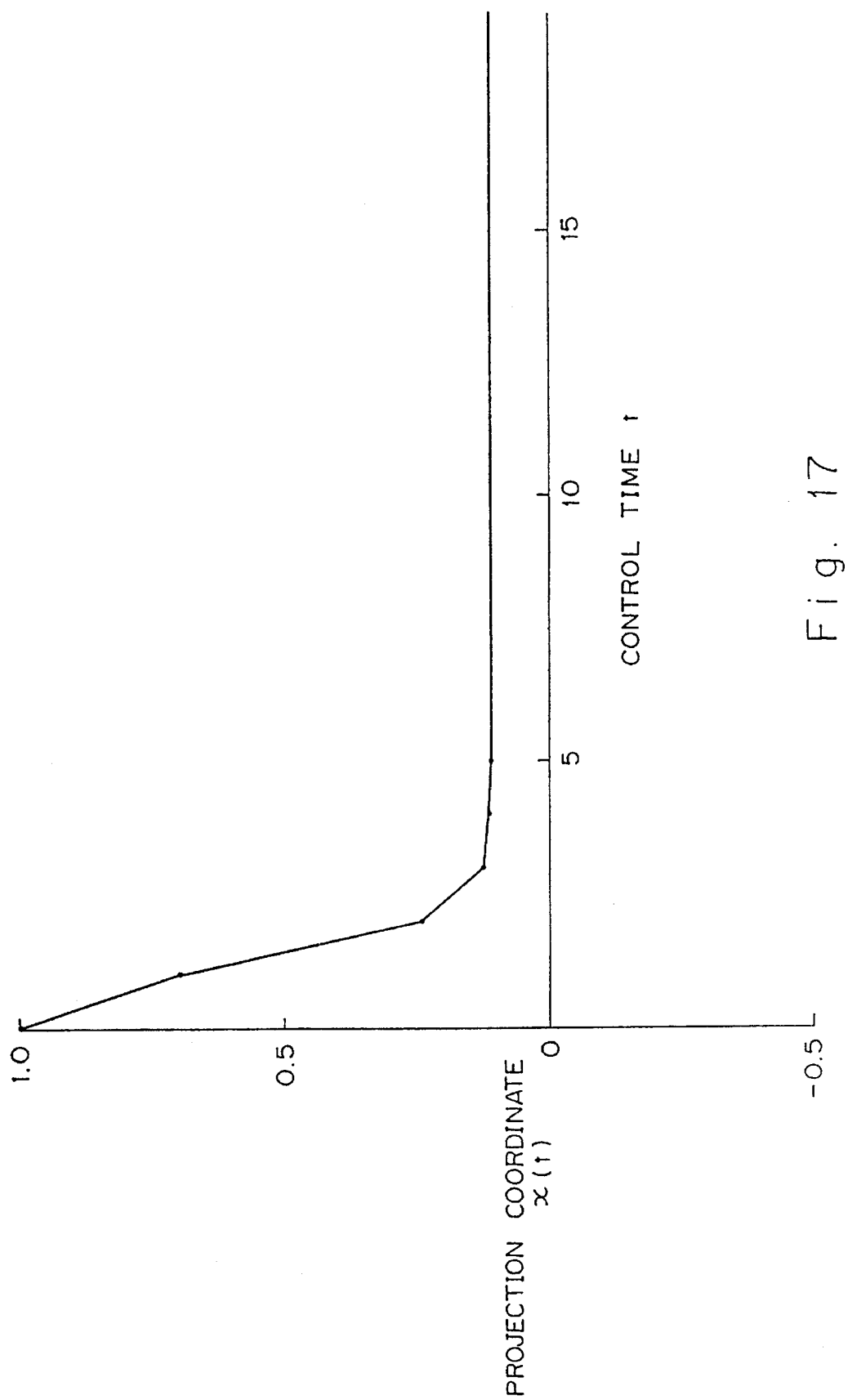
FIG. 17 shows a result of control by the prior art with a low gain.
Figure 18:
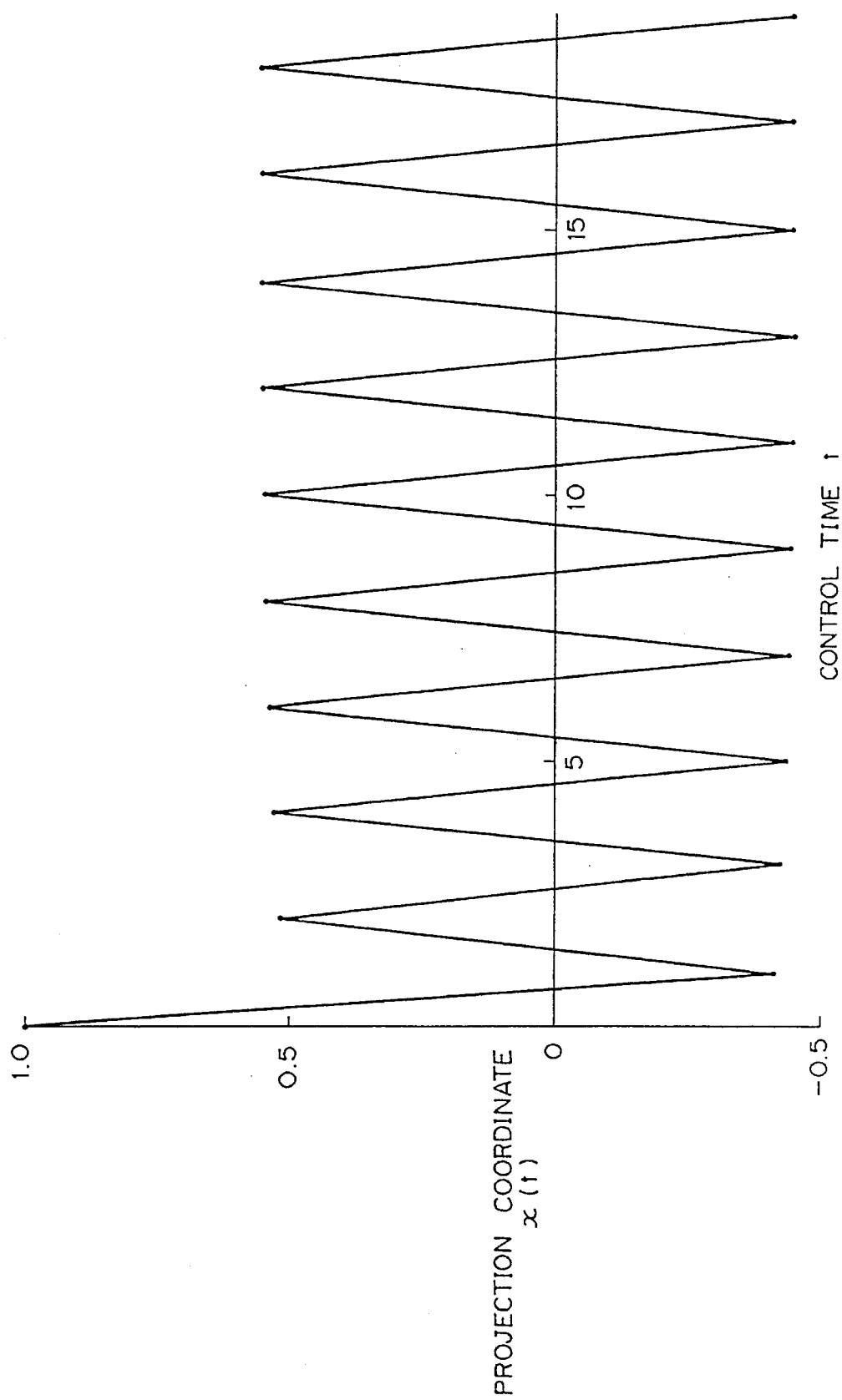
FIG. 18 shows a result of control by the prior art with a high gain.

FIGS. 17 and 18 show the results of control simulation using a prior art control unit which produces an actuating signal proportional to the difference between the desired value and a feedback quantity instead of using the predictive control unit 45.

FIG. 17 shows the result of control simulation when the gain of the control device is low, in which case, the projection coordinate x(t) does not approach the desired value at control times subsequent to t= 3.

FIG. 18 shows the result of control simulation when the gain is high. In this case, the projection coordinate x(t) continues to oscillate.

Figure 19:
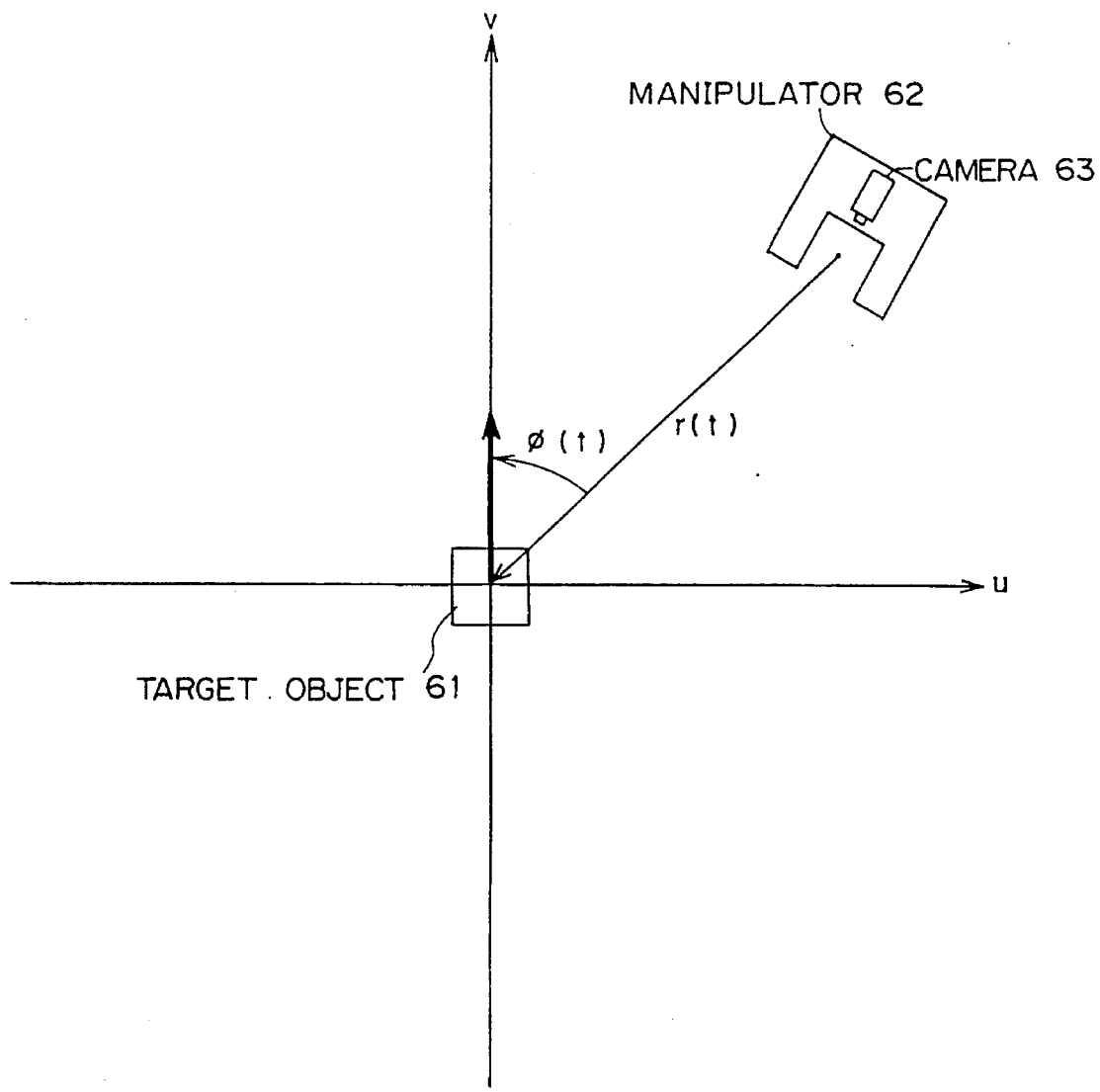
FIG. 19 shows a controlled object for multivariable control.

FIG. 19 shows an object of multivariable control according to the present invention. In FIG. 19, a target object 61 stands at the origin of the two-dimensional uv coordinate system while pointing to the positive direction of the v axis. At a control time t, the position of a manipulator 62 equipped with a camera 61 and a visual sensor not shown, is defined by a relative distance r(t) with respect to the origin and a relative angle $\phi(t)$ with respect to the v axis. The final goal of control is to grasp the target object 61 with the manipulator 62 from the $\phi(t)=0$ direction on the uv plane.

Figure 20:
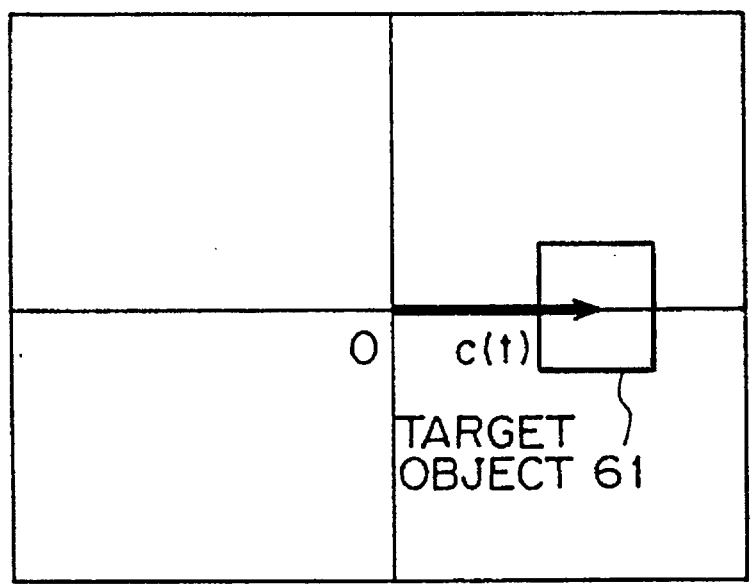
FIG. 20 shows a plane of projection of the camera of FIG. 19.

FIG. 20 shows the target object 61 on the plane of projection of the camera. In FIG. 20, c(t) indicates a projection coordinate of the center of gravity of the target object 61.

Figure 21:
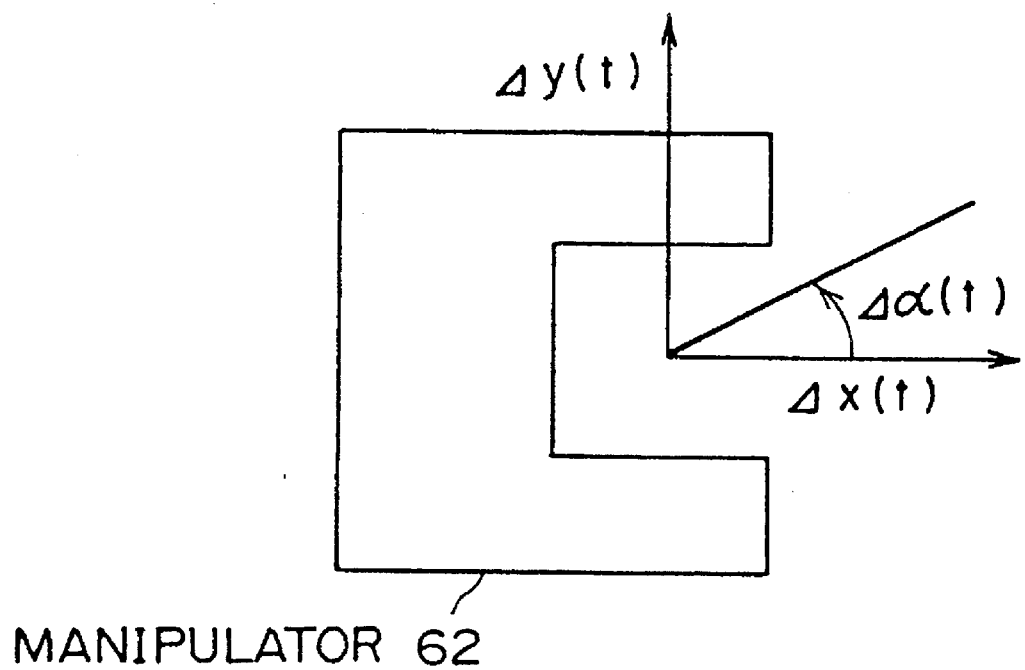
FIG. 21 is a diagram for use in explanation of an actuating signal for the manipulator of FIG. 19.

FIG. 21 shows positional displacements $\Delta x(t)$ and $\Delta y(t)$ and posture displacement $\Delta \alpha(t)$ of the manipulator 62 which are applied to actuators for controlling the position and posture of the manipulator 62. The displacements are defined by a relative coordinate system relative to the manipulator 62.

The relative distance r(t), the relative angle $\phi(t)$ and the projection coordinate c(t), which are detected by the visual sensor corresponding to the converting unit 2 of FIG. 3, correspond to feedback quantities, while the positional displacements $\Delta x(t)$ and $\Delta y(t)$ and the posture displacement $\Delta \alpha(t)$ correspond to actuating signals.

Figure 22:
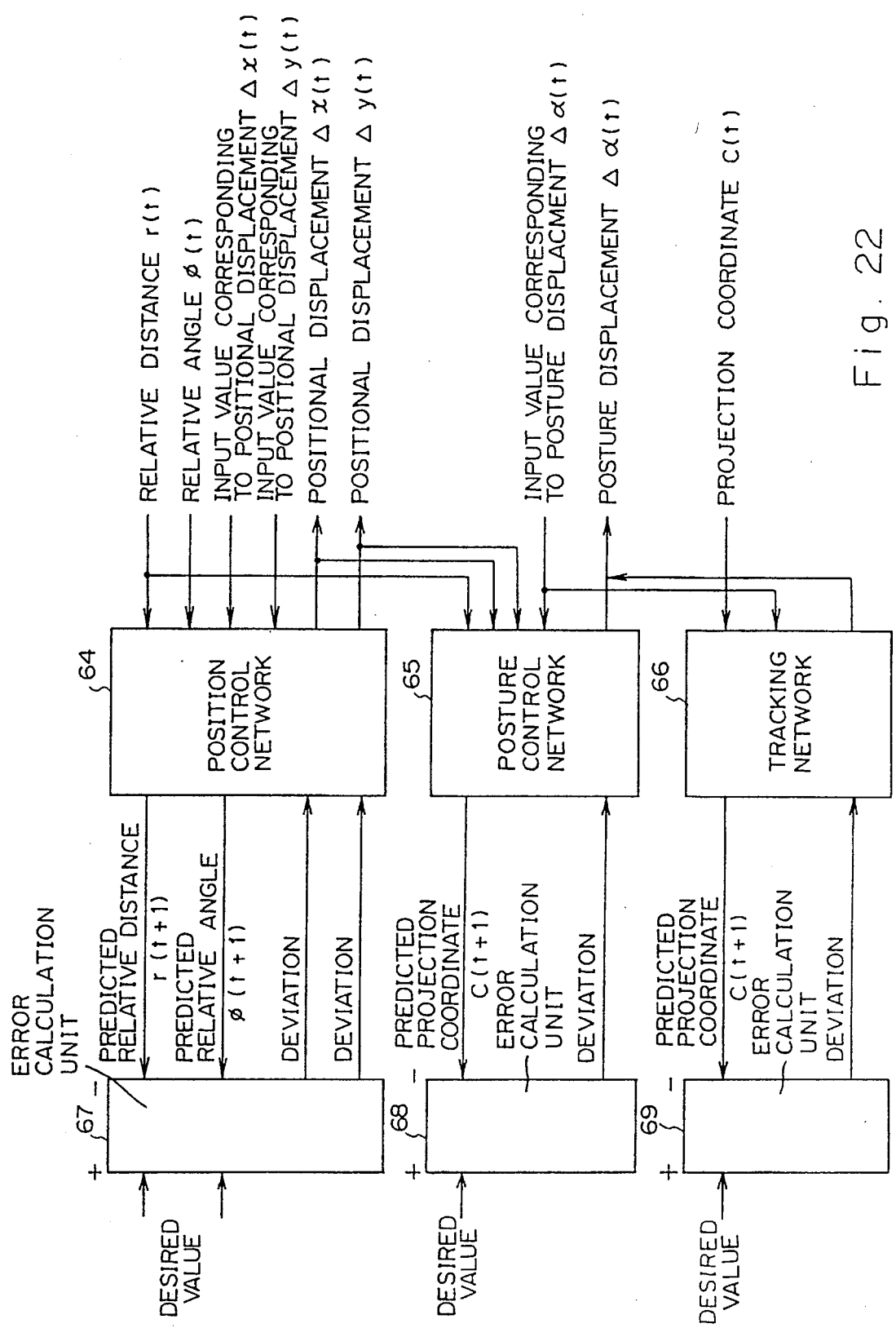
FIG. 22 shows a neural network used in a feedback control device of the present invention for the controlled object of FIG. 19.

FIG. 22 shows three neural networks in the predictive control device used in a feedback control device for controlling the controlled object of FIG. 19: a position control network 64, a posture control network 65, and a tracking network 66.

The position control network 64 predicts a predicted relative distance r(t+1) and a predicted relative angle $\phi(t+1)$ based on the relative distance r(t), the relative angle $\phi(t)$, an input value corresponding to the positional displacement $\Delta x(t)$, and an input value corresponding to the positional displacement $\Delta y(t)$. The position control network 64 outputs input values updated according to the relaxation algorithm as positional displacements $\Delta x(t)$ and $\Delta y(t)$.

The posture control network 65 predicts a predicted projection coordinate c(t+1) based on the relative distance r(t), the positional displacements $\Delta x(t)$ and $\Delta y(t)$ output from the position control network 64, and an input value corresponding to the posture displacement $\Delta \alpha(t)$. As a result, the input value corresponding to the posture displacement $\Delta \alpha(t)$ is updated in accordance with the relaxation algorithm. The posture control network 65 then outputs the updated input value as posture displacement $\Delta \alpha(t)$.

The tracking network 66 predicts a predicted projection coordinate C(t+1) on the basis of the projection coordinate C(t) and an input value corresponding to the posture displacement $\Delta \alpha(t)$ and updates the input value in accordance with the relaxation algorithm, and outputs it as posture displacement $\Delta \alpha(t)$.

Each of the error calculation units 67, 68 and 69 obtains a deviation between a corresponding feedback quantity and a corresponding desired value and inputs it to the corresponding neural network 64, 65 and 66.

When the predictive control device receives the feedback quantities r(t), $\phi(t)$, and c(t), the position control network 64 first outputs the positional displacements $\Delta x(t)$ and $\Delta y(t)$. The posture control network 65 then outputs the posture displacement $\Delta \alpha(t)$. The tracking network 66, which operates in cooperation with, and in parallel with the two other neural networks 64 and 65, uses a feedback quantity at a lower level than those for the two other neural networks, operates at shorter intervals of time, and controls the posture of the manipulator so as to constantly bring the target object to the center of the plane of projection of the camera.

Actual learning data utilized by the neural networks 64, 65 and 66 of FIG. 22 will now be described. When the manipulator 62 points to the origin at which the target object 61 is located, predicted feedback quantities r(t+1), $\phi(t+1)$ and c(t+1) are, using feedback quantities r(t) and $\phi(t)$ and actuating signals $\Delta x(t)$, $\Delta y(t)$ and $\Delta \alpha(t)$, described by $$r(t+1) = \sqrt{\{r(t) - \Delta x(t)\}^2 + \Delta y(t)^2} \qquad (17)$$

$$\phi(t+1) = \phi(t) + \tan^{-1}\left\{ \frac{\Delta y(t)}{r(t) - \Delta x(t)} \right\} \qquad (18)$$

$$c(t+1) = \left[ \sin \tan^{-1}\left\{ \frac{\Delta y(t)}{r(t) - \Delta x(t)} \right\} + \Delta \alpha(t) \right] \qquad (19)$$

Further, when the manipulator 62 does not point to the origin, the predicted projection coordinate c(t+1) and the projection coordinate c(t) are related by $$c(t+1) = \sin[\sin^{-1}\{c(t)\} + \Delta \alpha(t)] \qquad (20)$$

The learning data for the position control network 64 was created by equations (17) and (18) in the following ranges:

$$0.1 \leq r(t) \leq 1.0 \qquad (21)$$

$$-0.1 \leq \Delta x(t), \Delta y(t) \leq 1.0 \qquad (22)$$

$$-90° \leq \phi(t) \leq 90° \qquad (23)$$

The learning data for the posture control network 65 is created by equation (19) in the ranges (21) and (22) and in the following range:

$$-30° \leq \Delta \alpha(t) \leq 30° \qquad (24)$$

The learning data for the tracking network 56 is created by equation (20) in the range (24) and in the range (25):

$$-0.5 \leq c(t) \leq 0.5 \qquad (25)$$

Figure 23:
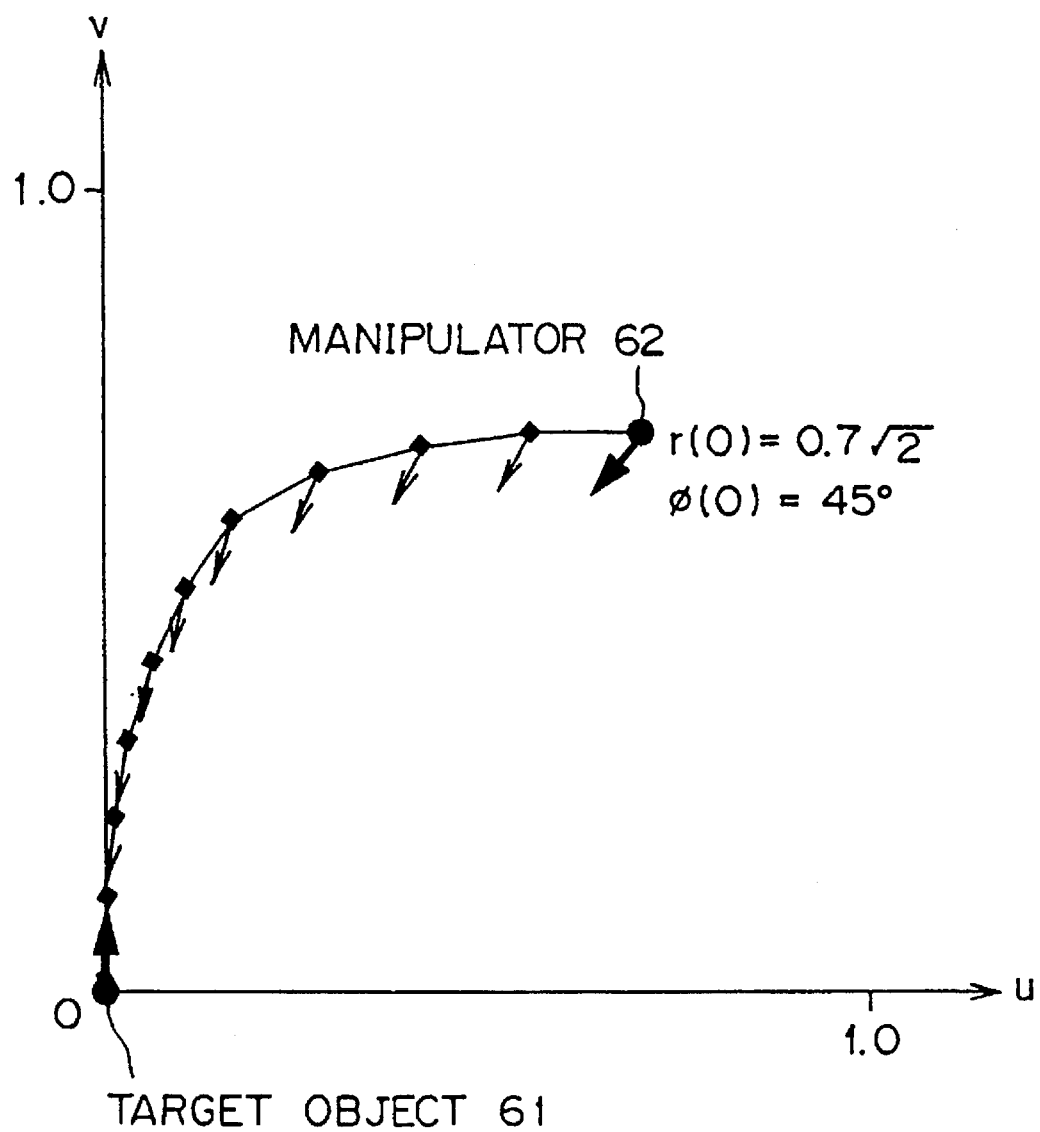
FIG. 23 shows a result of control using the neural network of FIG. 22.

Control simulation is performed on the controlled object of FIG. 19 using the neural networks which had learned the learning data thus created. FIG. 23 shows the resulting locus of the manipulator 62. In FIG. 23, an arrow at the origin represents the direction which the target object 61 faces, and other arrows represent directions which the manipulator 62 faces at instants of time during control. At time t=0, the manipulator 62 stays in the position defined by r(0)=0.7 $\sqrt{2}$ and $\phi(0)=45°$ and faces the origin. The goal of control is to grasp the target object 61 from the front where r(t)=0 and $\phi(t)=0$. As can be seen from FIG. 23, both the relative distance r(t) and the relative angle $\phi(t)$ decrease monotonously. More specifically, the manipulator 62 approaches the origin. Additionally, the manipulator 61 is controlled in such a way that it constantly faces the target object 61, or, more specified in such a way that the project coordinate c(t) approaches 0.

As can be understood from the control result shown in FIG. 23, the present invention provides a feedback control device which permits both quick response and good stability in the case of multivariable control as well.

What is claimed is:

1. A feedback control device comprising:

converting means for converting a controlled quantity output from a controlled object to a feedback quantity at a first control time comparable with a desired value;

predictive control means comprising a layered neural network and responsive to said feedback quantity, for generating a predicted feedback quantity at a second control time, back propagating a difference between said predicted feedback quantity and said desired value toward an input side of said layered neural network using a relaxation algorithm, and producing an actuating signal that decreases the difference; and actuating means responsive to said actuating signal for providing a corresponding control input to said controlled object.

2. A feedback control device according to claim 1, wherein said controlled quantity, said feedback quantity, said desired value, said actuating signal, and said control input are each a vector quantity.

3. A feedback control device according to claim 1, wherein said desired value is constant regardless of said first and second control times, and said control device performs a constant value control.

4. A feedback control device according to claim 1, wherein said desired value is programmable, and said control device performs a programed control.

5. A feedback control device according to claim 1, wherein said desired value changes arbitrarily, and said control device performs a follow-up control.

6. A feedback control device according to claim 1, wherein said controlled object outputs a plurality of controlled quantities, and said converting means provides said predictive control means with a plurality of feedback quantities corresponding to said controlled quantities.

7. A feedback control device according to claim 1, wherein said predictive control means outputs a plurality of actuating signals, and said actuating means provides said controlled object with a plurality of control inputs corresponding to said actuating signals.

8. A feedback control device according to claim 1, wherein said layered neural network comprises a first input-layer unit supplied with said feedback quantity, a second input-layer unit supplied with an input value corresponding to said actuating signal, and an output-layer unit for outputting said predicted feedback quantity; updates said input value corresponding to said actuating signal to reduce the difference between said predicted feedback quantity predicted by said layered neural network and said desired value; and applies the updated input value to said actuating means.

9. A feedback control device according to claim 8, wherein a weight of coupling between units of said layered neural network is changed by learning.

10. A feedback control device according to claim 8, wherein said predictive control means further comprises:

input value setting means for applying said input value corresponding to said actuating signal to said second input layer unit;

initial value setting means for applying an initial value of said input value corresponding to said actuating signal to said input value setting means;

error back propagation means for back propagating the difference as an error from said output-layer unit, to said second input-layer unit using said relaxation algorithm to thereby obtain an amount of correction for said input value to said second input-layer unit;

input value update means responsive to said amount of correction for updating said input value corresponding to said actuating signal and applying the updated input value to said input value setting means; and input value fetch means for fetching the updated input value from said input value setting means and applying the update input value to said actuating means as an actuating signal.

11. A feedback control device according to claim 10, wherein said predictive control means further comprises end determination means for determining whether an end condition is met and outputting an update end signal to said error back propagation means, said input value update means and said input value fetch means when said end condition is met.

12. A feedback control device according to claim 10, wherein said error back propagation means obtains an amount of correction which permits said input value corresponding to said actuating signal to be within an allowable input range of said actuating means.

13. A predictive controller with a layered neural network, comprising:

first input-layer means for receiving a first quantity of a first control time;

second input-layer means for receiving a second quantity;

output-layer means for outputting a predicted quantity corresponding to said first quantity at a second control time; and updating means for back propagating a difference between said predicted quantity and a desired value of said first quantity from said output-layer means to said second input-layer means, thereby updating said second quantity to reduce the difference.

\* \* \* \* \*

UNITED STATES PATENT AND TRADEMARK OFFICE
CERTIFICATE OF CORRECTION

PATENT NO. : 5,498,943
DATED : March 12, 1996
INVENTOR(S) : Takashi KIMOTO, et al.

It is certified that error appears in the above-indentified patent and that said Letters Patent is hereby corrected as shown below:

Column 1, line 48, after "and" delete --,--.

Column 2, line 1, after "and" delete --,--;

line 14, after "thus" insert --,--.

Column 4, line 51, change "detecting" to --converting--.

Column 6, Equation 7, line 1 & 2 after "f" (each occurrence) insert --'--

Equation 11, after "f", first occurrence, insert --'--;

line 63, after "or" delete --,--.

Column 7, line 16, delete "of";

line 18, delete ", while" and insert --of Fig. 3. Additionally--;

line 18, after "41" insert --of Fig. 10--;

line 20, after "Fig. 3." delete "The" and insert --Moreover, the--.

Column 8, line 63, after "which" delete "had".

UNITED STATES PATENT AND TRADEMARK OFFICE
CERTIFICATE OF CORRECTION

PATENT NO. : 5,498,943
DATED : March 12, 1996
INVENTOR(S) : Takashi KIMOTO, et al.

It is certified that error appears in the above-indentified patent and that said Letters Patent is hereby corrected as shown below:

Column 9, line 53 change "c(t+1)" to --C(t+1)--;

line 65, after "$\Delta\alpha(t)$" insert --,--; and line 65, delete "and".

Column 10, line 51, change "56" to --66--; and line 56, delete "had".

Signed and Sealed this

Thirtieth Day of July, 1996

Attest:

BRUCE LEHMAN

*Attesting Officer*    *Commissioner of Patents and Trademarks*